(12) United States Patent
Takata et al.

(10) Patent No.: US 12,115,947 B2
(45) Date of Patent: Oct. 15, 2024

(54) CLEANING DEVICE, IMAGING UNIT INCLUDING CLEANING DEVICE, AND CONTROL METHOD

(71) Applicant: Murata Manufacturing Co., Ltd., Nagaokakyo (JP)

(72) Inventors: Masaaki Takata, Nagaokakyo (JP); Yuzo Mizushima, Nagaokakyo (JP); Takaaki Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 367 days.

(21) Appl. No.: 17/574,612

(22) Filed: Jan. 13, 2022

(65) Prior Publication Data

US 2022/0134760 A1    May 5, 2022

Related U.S. Application Data

(63) Continuation of application No. PCT/JP2021/008976, filed on Mar. 8, 2021.

(30) Foreign Application Priority Data

Jul. 3, 2020    (JP) ................. 2020-115675

(51) Int. Cl.
*B06B 1/06*    (2006.01)
*B08B 3/02*    (2006.01)
(Continued)

(52) U.S. Cl.
CPC .............. *B60S 1/52* (2013.01); *B06B 1/0644* (2013.01); *B08B 3/02* (2013.01); *B08B 13/00* (2013.01);
(Continued)

(58) Field of Classification Search
None
See application file for complete search history.

(56) References Cited

U.S. PATENT DOCUMENTS

2013/0276627 A1    10/2013  Luo
2018/0154406 A1     6/2018  Magee et al.
(Continued)

FOREIGN PATENT DOCUMENTS

JP    2879155 B2    4/1999
JP    5948781 B2    7/2016
(Continued)

OTHER PUBLICATIONS

International Search Report in PCT/JP2021/008976, mailed Jun. 1, 2021, 3 pages.
(Continued)

*Primary Examiner* — Levon J Shahinian
(74) *Attorney, Agent, or Firm* — Keating & Bennett, LLP

(57) ABSTRACT

A cleaning device includes a protection cover in a viewing field of a camera, a piezoelectric material to vibrate the protection cover, a driver to drive the piezoelectric material, a vibrator to detect a signal related to a vibration level of the protection cover vibrated with the piezoelectric material, and a controller to control the driver based on a signal detected by the vibration sensor so that the signal detected by the vibrator matches a predetermined target value of the vibration level of the protection cover.

18 Claims, 13 Drawing Sheets

(51) Int. Cl.
  B08B 13/00 (2006.01)
  B60S 1/52 (2006.01)
  B60S 1/56 (2006.01)
  G02B 27/00 (2006.01)
  H04N 23/50 (2023.01)
  H04N 23/51 (2023.01)
  H04N 23/52 (2023.01)
  H04N 23/55 (2023.01)
  H04N 23/60 (2023.01)

(52) U.S. Cl.
  CPC ............ *B60S 1/56* (2013.01); *G02B 27/0006* (2013.01); *H04N 23/50* (2023.01); *H04N 23/51* (2023.01); *H04N 23/52* (2023.01); *H04N 23/55* (2023.01); *H04N 23/60* (2023.01)

(56) References Cited

U.S. PATENT DOCUMENTS

2018/0329205 A1    11/2018  Cohen et al.
2018/0329206 A1*   11/2018  Cohen .................... B08B 7/028
2020/0057301 A1     2/2020  Kuratani et al.

FOREIGN PATENT DOCUMENTS

JP      2020501200 A    1/2020
JP      2020519433 A    7/2020
WO      2018198465 A1  11/2018

OTHER PUBLICATIONS

Written Opinion in PCT/JP2021/008976, mailed Jun. 1, 2021, 5 pages.

* cited by examiner

CLEANING DEVICE, IMAGING UNIT INCLUDING CLEANING DEVICE, AND CONTROL METHOD

CROSS REFERENCE TO RELATED APPLICATIONS

This application claims the benefit of priority to Japanese Patent Application No. 2020-115675 filed on Jul. 3, 2020 and is a Continuation Application of PCT Application No. PCT/JP2021/008976 filed on Mar. 8, 2021. The entire contents of each application are hereby incorporated herein by reference.

BACKGROUND OF THE INVENTION

1. Field of the Invention

The present invention relates to a cleaning device, an imaging unit including a cleaning device, and a control method.

2. Description of the Related Art

An imaging unit has been provided on a front portion or a back portion of a vehicle to capture and record an image, and to control a security device based on the image captured by the imaging unit. Such an imaging unit is often mounted on a vehicle exterior. Therefore, foreign matter such as raindrops, mud, and dusts sometimes stick to a light transmission body (such as a lens and protection glass) covering the outer portion of an imaging element of the imaging unit. When foreign matter sticks to the light transmission body, the foreign matter appears on an image picked up by the imaging unit, resulting in an unclear image.

Therefore, imaging units that have a function to remove foreign matter such as raindrops sticking to a light transmission body covering an outer portion of an imaging element have been developed (for example, Japanese Patent No. 5948781 and Japanese Patent No. 2879155). In the imaging unit disclosed in Japanese Patent No. 5948781, the light transmission body is vibrated with a piezoelectric material so as to remove water droplets sticking to the light transmission body. In the imaging unit, image processing is performed with respect to an image of a camera so as to recognize water droplets and a drive frequency of the piezoelectric material is set depending on the recognition result.

In the imaging unit disclosed in Japanese Patent No. 2879155, a piezoelectric material is driven by an alternating current signal having a frequency, which is equal to a resonant frequency of the light transmission body, in a cleaning device that vibrates the light transmission body with the piezoelectric material so as to remove water droplets sticking to the light transmission body.

Concerning the imaging unit described in Japanese Patent No. 5948781, the requirement to perform the image processing to an image of the camera makes it impossible to reduce the cost. Also, the image processing is required to be performed without fail so as to set the drive frequency of the piezoelectric material. This requires high cost and makes it impossible to remove stuck foreign matter in real time. Concerning the imaging unit described in Japanese Patent No. 2879155, the light transmission body is vibrated at the resonant frequency at which the vibration level of the light transmission body is a maximum and therefore, high stress is applied to a bonding portion between the light transmission body and the piezoelectric material and, for example, a crack is accordingly generated, shortening the endurance time.

SUMMARY OF THE INVENTION

Preferred embodiments of the present invention provide cleaning devices, imaging units each including a cleaning device, and control methods, with each of which foreign matter is able to be removed in real time at low cost and an endurance time is able to be increased.

A cleaning device according to a preferred embodiment of the present invention includes a light transmission body in a viewing field of an imaging device, a vibrator to vibrate the light transmission body, a driver to drive the vibrator, a detector to detect a signal related to a vibration level of the light transmission body vibrated with the vibrator, and a controller to control the driver based on a signal detected by the detector so that the signal detected by the detector matches a predetermined target value of the vibration level of the light transmission body.

An imaging unit according to a preferred embodiment of the present invention includes an imaging device, and a cleaning device according to a preferred embodiment of the present invention.

A control method according to a preferred embodiment of the present invention is a control method for a cleaning device, the cleaning device including a light transmission body in a viewing field of an imaging device, a vibrator to vibrate the light transmission body, a driver to drive the vibrator, a detector to detect a signal related to a vibration level of the light transmission body vibrated with the vibrator, and a controller to control the driver based on a signal detected by the detector. The control method includes driving the vibrator in a foreign matter detection mode in which the driver is controlled so that a signal detected by the detector matches a first target value, determining whether or not a frequency for driving the vibrator is lowered when controlling the driver in the foreign matter detection mode, driving the vibrator in a foreign matter removal mode in which the driver is controlled so that a signal detected by the detector matches a second target value, the second target value being a higher vibration level than the first target value, in a case where the frequency for driving the vibrator is lowered, and returning driving of the vibrator to the foreign matter detection mode such that the frequency for driving the vibrator is returned to a frequency of the foreign matter detection mode when controlling the driver in the foreign matter removal mode.

According to preferred embodiments of the present invention, the controller controls the driver so that a signal detected by the detector matches a predetermined target value of the vibration level of the light transmission body, and accordingly, foreign matter is able to be removed in real time at low cost and endurance time is able to be increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
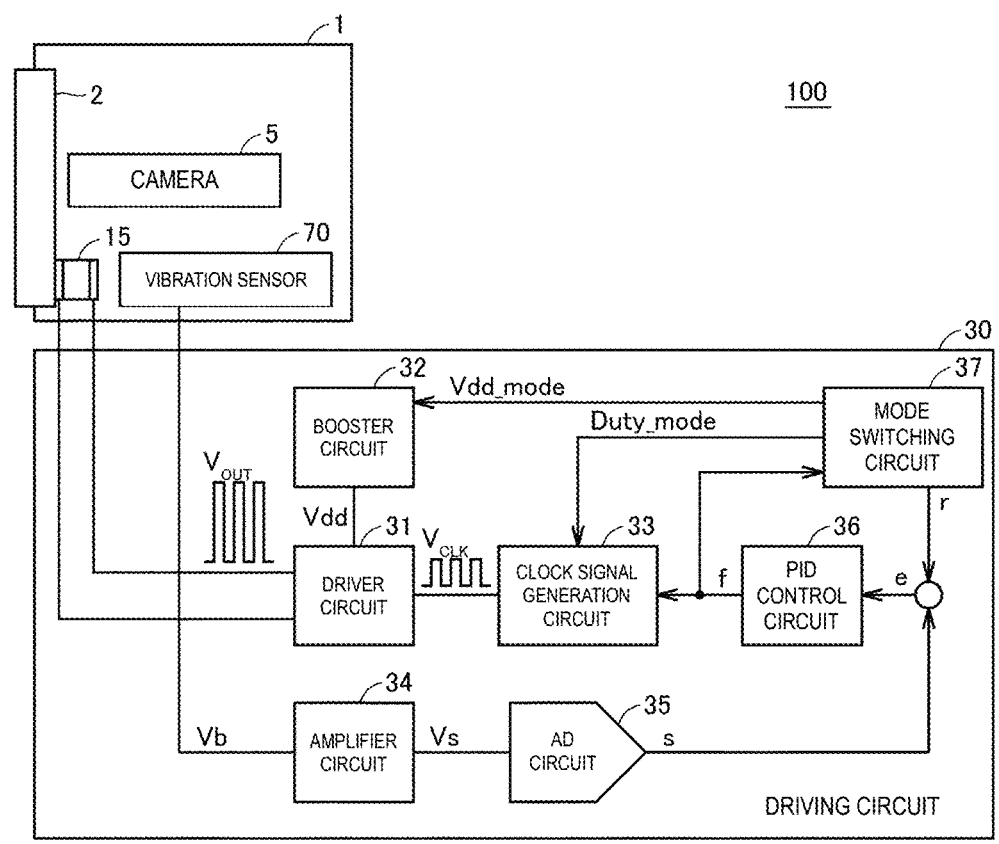
FIG. 1 is a block diagram for explaining a cleaning device of an imaging unit according to a first preferred embodiment of the present invention.

Imaging units according to preferred embodiments of the present invention will be described in detail below with reference to the accompanying drawings. The same reference characters denote the same or corresponding portions in the drawings.

First Preferred Embodiment

An imaging unit according to a first preferred embodiment of the present invention will be described below. FIG. 1 is a block diagram for explaining a cleaning device of an imaging unit 100 according to the first preferred embodiment. The imaging unit 100 includes a casing 1, a protection cover 2, a camera 5, a piezoelectric material 15, a driving circuit 30, and a vibration sensor 70. Here, the protection cover 2, the piezoelectric material 15, the driving circuit 30, and the vibration sensor 70, excluding the camera 5 of the imaging unit 100, defines a cleaning device to clean off foreign matter (deposits) present in an imaging range of the camera 5.

The camera 5 is an imaging device, is provided on the inner side of the protection cover 2, and is fixed to a holder, not illustrated, in the casing 1. A circuit, not illustrated, including an imaging element is included in the camera 5. Further, a lens module, not illustrated, is provided in an imaging direction of the camera 5. Examples of the imaging element include a charge coupled device (CCD) image sensor and a complementary MOS (CMOS) image sensor. The lens module has a cylindrical or substantially cylindrical body and includes a plurality of lenses. The configuration of the camera 5 is not particularly limited as long as the camera 5 is capable of picking up an image of an imaging object positioning at the front of the protection cover 2.

The casing 1 has a rectangular or substantially rectangular cylindrical shape, for example, and is made of metal or synthetic resin, for example. The casing 1 may have another shape such as a cylindrical or substantially cylindrical shape. The protection cover 2 is provided on one end side of the casing 1. The camera 5 is disposed on the inner side of the protection cover 2 and an image of an imaging object on the outside is picked up through the protection cover 2.

The protection cover 2 has a flat or substantially flat plate shape. The protection cover 2 may have, for example, a dome shape or an approximate dome shape, instead of the flat plate shape. The dome shape or approximate dome shape of the protection cover 2 may include a hemispherical or substantially hemispherical shape, a shape obtained by connecting a cylinder to a hemisphere, and a curved surface shape smaller than a hemisphere, for example.

The protection cover 2 has translucency. In the first preferred embodiment, the protection cover 2 is made of glass, for example. However, transparent plastic or the like may be used instead of glass, for example. Alternatively, for example, translucent ceramics may be used. Tempered glass is preferably used depending on the purpose. This increases the strength. In the use of glass, a coating layer made of, for example, DLC or the like may be provided on the surface so as to increase the strength.

The piezoelectric material 15 is a vibrator to vibrate the protection cover 2 and is made of PZT-based piezoelectric ceramics, for example. Other piezoelectric ceramics such as, for example, $(K,Na)NbO_3$ may be used. Also, piezoelectric single crystal such as, for example, $LiTaO_3$ may be used.

The piezoelectric material 15 is driven by the driving circuit 30. The driving circuit 30 includes a driver circuit 31 and a proportional-integral-differential (PID) control circuit 36. The driver circuit 31 operates as a driver to drive the piezoelectric material 15. The PID control circuit 36 operates as a controller to control the driver based on a signal detected by the vibration sensor 70.

The driving circuit 30 will be described in more detail. The driving circuit 30 includes the driver circuit 31, a booster circuit 32, and a clock signal generation circuit 33. The driver circuit 31 supplies a drive signal to the piezoelectric material 15. The booster circuit 32 determines an amplitude voltage of a drive signal generated by the driver circuit 31. The clock signal generation circuit 33 determines a duty ratio of a drive signal generated by the driver circuit 31.

Figure 2A:
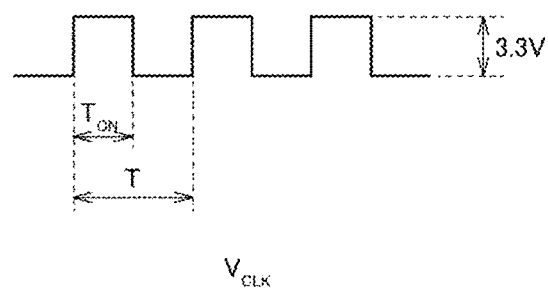
FIGS. 2A and 2B are drawings for explaining a drive signal for driving the cleaning device of the imaging unit according to the first preferred embodiment of the present invention.
Figure 2B:
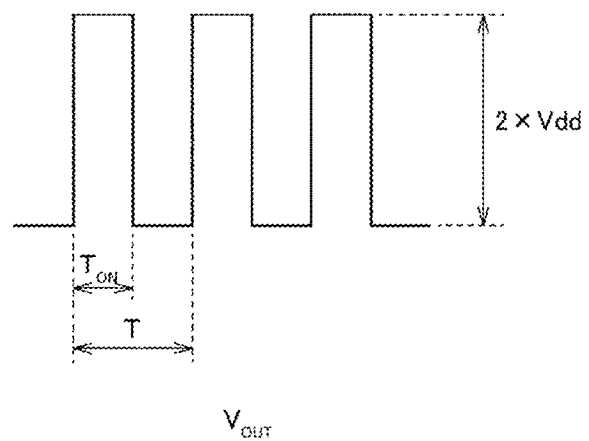

FIGS. 2A and 2B are drawings for explaining a drive signal to drive the cleaning device of the imaging unit according to the first preferred embodiment. FIG. 2A illustrates a clock signal $V_{CLK}$ that is supplied to the driver circuit 31 from the clock signal generation circuit 33, and FIG. 2B illustrates a drive signal $V_{OUT}$ that is supplied to the piezoelectric material 15 from the driver circuit 31. FIG. 2A shows the clock signal $V_{CLK}$ having the amplitude voltage of about 3.3 V, a cycle T, and an ON period $T_{ON}$. Accordingly, the duty ratio D ($=T_{ON}/T$) of the clock signal $V_{CLK}$ is determined depending on the cycle T and the ON period $T_{ON}$. The frequency f of the clock signal $V_{CLK}$ is expressed as f=1/T.

The drive signal $V_{OUT}$ illustrated in FIG. 2B has the cycle T and the ON period $T_{ON}$ that are the same or substantially the same as those of the clock signal $V_{CLK}$. Therefore, the duty ratio D of the drive signal $V_{OUT}$ can be changed by changing the duty ratio D of the clock signal $V_{CLK}$ with the clock signal generation circuit 33. An amplitude voltage of the drive signal $V_{OUT}$ illustrated in FIG. 2B is about twice as high as a voltage $V_{dd}$ boosted by the booster circuit 32. That is, the amplitude voltage ($2 \times V_{dd}$) of the drive signal $V_{OUT}$ can be changed by changing the voltage $V_{dd}$ boosted by the booster circuit 32.

The driving circuit 30 controls the driver circuit 31 so that a signal detected by the vibration sensor 70 matches a predetermined target value of the vibration level of the protection cover 2. The driving circuit 30 therefore includes an amplifier circuit 34, an AD circuit 35, and the PID control circuit 36. The amplifier circuit 34 amplifies a signal Vb detected by the vibration sensor 70. The AD circuit 35 converts a signal Vs amplified by the amplifier circuit 34 into a digital signal. Here, the vibration level of the protection cover 2 is defined as an acceleration rate of displacement of a central portion in the protection cover 2, for example. The vibration level of the protection cover 2 is not limited to this, but may be, for example, a displacement amount of the central portion in the protection cover 2.

The PID control circuit 36 adjusts the frequency f of the clock signal generation circuit 33 with respect to deviation e between a signal s from the vibration sensor 70 and a target value r depending on three elements that are proportionality, integration, and differentiation of the deviation e so as to perform feed-back control of a drive signal of the driver circuit 31. The control for a drive signal of the driver circuit 31 is not limited to being performed by the PID control circuit 36 but may be performed by any control circuit as long as the control circuit is capable of performing control so that a signal detected by the vibration sensor 70 matches a predetermined target value of the vibration level of the protection cover 2.

The driving circuit 30 further includes a mode switching circuit 37. The mode switching circuit 37 is capable of performing switching to a voltage mode (Vdd_mode) or a duty mode (Duty_mode) depending on an output signal of the PID control circuit 36. In the voltage mode, the drive signal $V_{OUT}$ is adjusted depending on the voltage $V_{dd}$ boosted by the booster circuit 32. In the duty mode, the drive signal $V_{OUT}$ is adjusted depending on the duty ratio D of the clock signal $V_{CLK}$.

The vibration sensor 70 operates as a detector to detect a signal related to the vibration level of the protection cover 2 which is vibrated with the piezoelectric material 15. The vibration sensor 70 is an ultrasonic sensor or a microphone, for example, and is positioned to be spaced from and not in contact with the protection cover 2. When an ultrasonic sensor is used as the vibration sensor 70, an ultrasonic wave emitted from the protection cover 2, which is vibrated, is detected as the signal related to the vibration level of the protection cover 2. As the vibration sensor 70 is spaced from and not in contact with the protection cover 2, the vibration sensor 70 can detect foreign matter sticking to the protection cover 2 in real time without disturbing the vibration of the protection cover 2. Here, the vibration sensor 70 is not limited to an ultrasonic sensor, a microphone, or the like that detects the vibration level of the protection cover 2 using sound, but the vibration sensor 70 may be, for example, a laser sensor or the like that detects the vibration level of the protection cover 2 by using light.

Figure 3:
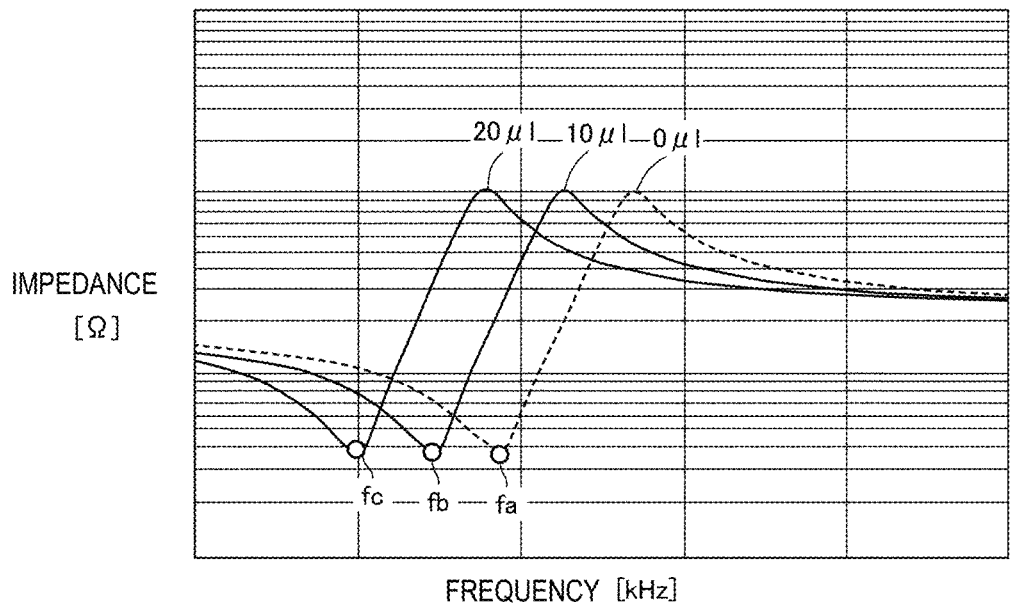
FIG. 3 is a drawing for explaining a relationship between a drive frequency of a protection cover and foreign matter sticking to the protection cover.

Next, FIG. 3 is a drawing for explaining a relationship between a drive frequency of the protection cover 2 and foreign matter sticking to the protection cover 2. In FIG. 3, the horizontal axis indicates a frequency (in kHz) of a drive signal and the vertical axis indicates an impedance (in Ω) of the piezoelectric material 15. FIG. 3 shows three graphs that are a graph obtained when 0 (zero) μl of a water droplet is stuck on the protection cover 2, a graph obtained when about 10 μl of water droplets is stuck on the protection cover 2, and a graph obtained when about 20 μl of water droplets is stuck on the protection cover 2.

As can be seen from FIG. 3, as the amount of water droplets sticking to the protection cover 2 is increased, a frequency on points fa, fb, and fc at which an impedance largely changes is decreased. Further, the points fa, fb, and fc at which an impedance largely changes represent resonance frequencies of the piezoelectric material 15 and drive frequencies at which displacement of the central portion of the protection cover 2 becomes a maximum. Concerning the points fa, fb, and fc, as the amount of water droplets sticking to the protection cover 2 is increased, the frequency is shifted to the lower frequency side and the impedance is increased.

Figure 4:
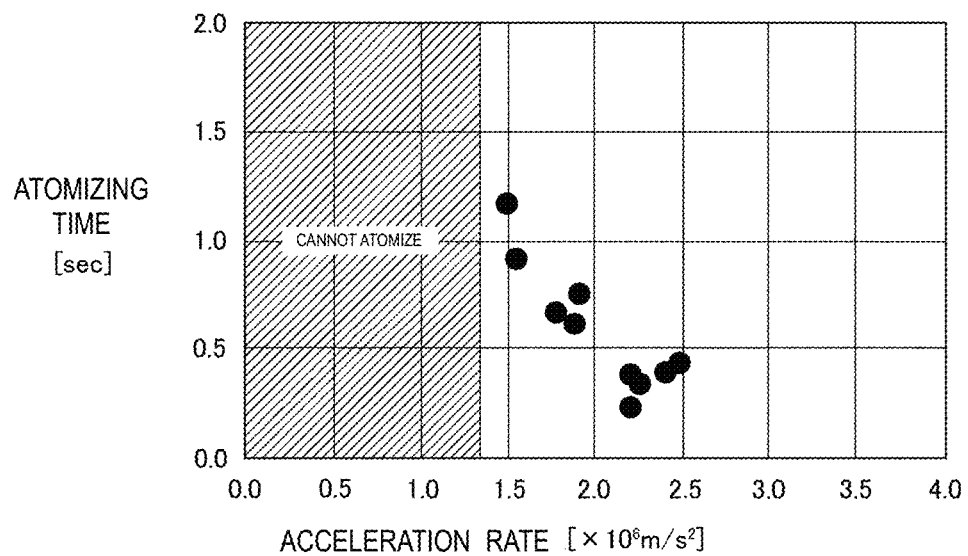
FIG. 4 is a drawing for explaining a relationship between an atomizing time of foreign matter sticking to the protection cover and a vibration level.

Next, FIG. 4 is a drawing for explaining a relationship between an atomizing time of foreign matter sticking to the protection cover 2 and a vibration level. In FIG. 4, the horizontal axis indicates an acceleration rate (in units of $\times 10^6$ m/s$^2$) representing a vibration level and the vertical axis indicates an atomizing time (in seconds). Here, the vibration level is represented by an acceleration rate of the displacement at the central portion of the protection cover 2 obtained when the protection cover 2 is vibrated in the vibration mode in which the displacement at the central portion of the protection cover 2 becomes maximum. Specifically, an acceleration rate A (m/s$^2$) can be derived from $A = d \times (2\pi f)^2$ based on displacement d (m) of the central portion of the protection cover 2 obtained in driving at the frequency f (Hz). For example, when the acceleration rate A=about $1.5 \times 10^6$ (m/s$^2$) and the frequency f=about 50 kHz, the displacement d at the central portion of the protection cover 2 is approximately 15.2 (μm).

The atomizing time is the time in which a total of about 10 μl of water droplets stuck on the protection cover 2 (for example, about 2 μl of water droplets is stuck on each of five places) can be atomized and removed. As can be seen from FIG. 4, as the vibration level (acceleration rate) is larger, the atomizing time is shorter and foreign matter removing performance is higher.

Figure 5:
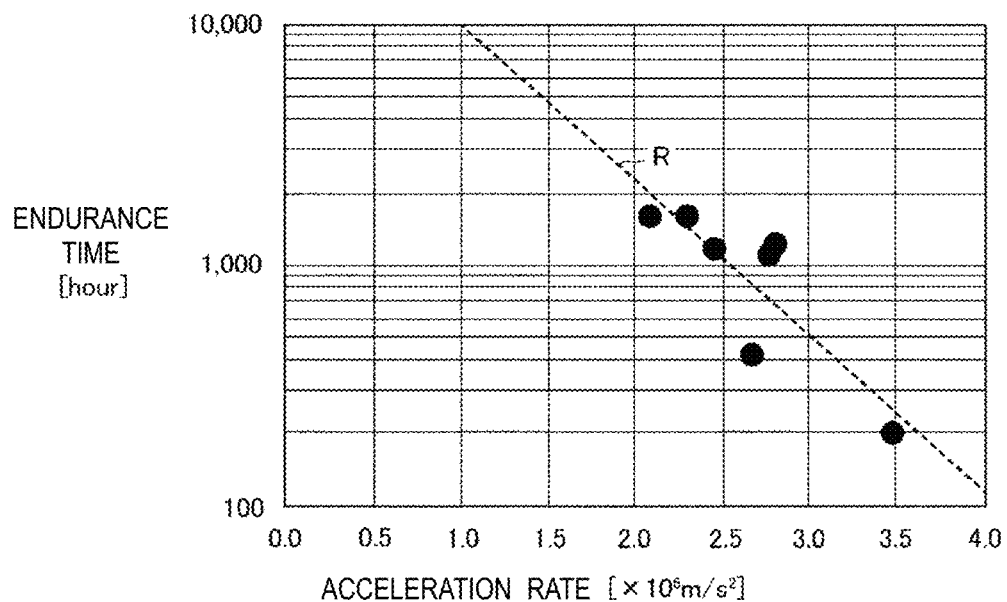
FIG. 5 is a drawing for explaining a relationship between an endurance time of the cleaning device and a vibration level.

FIG. 5 is a drawing for explaining a relationship between an endurance time of the cleaning device and a vibration level. In FIG. 5, the horizontal axis indicates an acceleration rate (in units of $\times 10^6$ m/s$^2$) representing a vibration level and the vertical axis indicates endurance time (in hours). The result illustrated in FIG. 5 is a result obtained when the protection cover 2 is vibrated in the vibration mode in which the displacement of the central portion of the protection cover 2 becomes a maximum. Here, the endurance time is the time until which a specific failure or malfunction occurs, for example, a time which is determined based on failure determination criteria. Specifically, the failure determination criteria used to determine endurance time in FIG. 5 determine a state in which the maximum acceleration rate is below about $1.5 \times 10^6$ m/s$^2$ and the cleaning device cannot atomize foreign matter sticking to the protection cover, as a failure. Failures of the cleaning device mostly occur when a crack is generated on the bonding portion between the light transmission body and the piezoelectric material due to application of high stress to the bonding portion.

The test for endurance time illustrated in FIG. 5 was performed on the environmental conditions that the ambient temperature was about 85° C. and the humidity was about 85%, for example. As can be seen from the result illustrated in FIG. 5, as the vibration level (acceleration rate) is lower, the stress on the bonding portion between the protection cover 2 and the piezoelectric material 15 is reduced and the endurance time of the cleaning device is increased. If a plurality of test results between the endurance time of the cleaning device and the vibration level are plotted and a regression line is obtained, a straight line as the graph R can be obtained. This graph R shows that the endurance time is approximately 4800 hours when the acceleration rate is about $1.5 \times 10^6$ m/s$^2$, for example.

However, the increase in the endurance time of the cleaning device and the improvement of the foreign matter removable performance are contrary to each other as illustrated in FIGS. 4 and 5. If about 2000 hours of endurance time, for example, is achieved to lower a failure risk of the cleaning device, the acceleration rate is preferably set to about $2.0 \times 10^6$ m/s$^2$ or lower based on the graph R illustrated in FIG. 5. On the other hand, in order to atomize foreign matter sticking to the protection cover 2, the acceleration rate is preferably set to about $1.5 \times 10^6$ m/s$^2$ or higher based on FIG. 4, for example.

Figure 6:
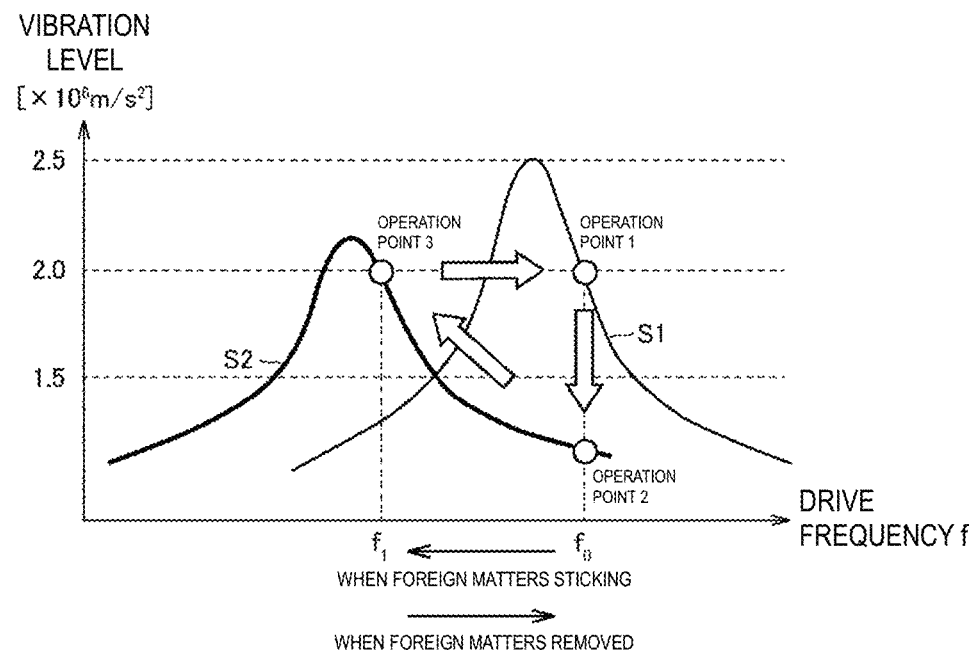
FIG. 6 is a drawing for explaining driving for removing foreign matter in the cleaning device of the imaging unit according to the first preferred embodiment of the present invention.

The cleaning device of the imaging unit 100 according to the first preferred embodiment performs control such that the protection cover 2 is not vibrated at a resonant frequency (vibration mode), at which the displacement of the central portion of the protection cover 2 becomes a maximum, but the protection cover 2 is maintained to vibrate at a frequency (target value) shifted from the resonant frequency. Specifically, the cleaning device of the imaging unit 100 controls the vibration level of the protection cover 2 so that a target vibration level is maintained by using the driving circuit 30 that performs feed-back control for a drive signal of the driver circuit 31. FIG. 6 is a drawing for explaining driving to remove foreign matter in the cleaning device of the imaging unit 100 according to the first preferred embodiment. In FIG. 6, the horizontal axis indicates a drive frequency f and the vertical axis indicates an acceleration rate (in units of $\times 10^6$ m/s$^2$) representing a vibration level.

In the example illustrated in FIG. 6, on the vibration level on which the acceleration rate=about $2.5 \times 10^6$ m/s$^2$ is obtained when the protection cover 2 with no foreign matter stuck thereon is vibrated at a resonant frequency, the protection cover 2 is vibrated with a target vibration level set to an acceleration rate=about $2.0 \times 10^6$ m/s$^2$. On an operation point 1 on which the protection cover 2 with no foreign matter stuck thereon is vibrated at the acceleration rate=about $2.0 \times 10^6$ m/s$^2$, the drive frequency $f_0$ is obtained.

If foreign matter sticks to the protection cover 2 when vibrating the protection cover 2 at the drive frequency $f_0$, the vibration level is lowered and the operation point shifts from the operation point 1 to an operation point 2. That is, the vibration mode is switched from a vibration mode S1 of the protection cover 2 with no foreign matter sticking thereon to a vibration mode S2 of the protection cover 2 with foreign matter sticking thereon.

The driving circuit 30 adjusts the amplitude voltage or the duty ratio D of the drive signal $V_{OUT}$, which is supplied from the driver circuit 31 to the piezoelectric material 15, so as to return the vibration of the protection cover 2, which is reduced to the vibration level of the operation point 2, to the acceleration rate=about $2.0 \times 10^6$ m/s$^2$ which is the target vibration level. Specifically, the PID control circuit 36 adjusts the frequency f to be inputted into the clock signal generation circuit 33 so as to obtain the target vibration level on the condition of the amplitude voltage or the duty ratio D of the drive signal $V_{OUT}$ that is designated by the mode switching circuit 37. On an operation point 3 on which the protection cover 2 with foreign matter sticking thereon is vibrated at the acceleration rate=about $2.0 \times 10^6$ m/s$^2$, the drive frequency is lowered from the drive frequency $f_0$ to the drive frequency $f_1$.

When the protection cover 2 with foreign matter stuck thereon is vibrated at the acceleration rate=about $2.0 \times 10^6$ m/s$^2$ on the operation point 3, the foreign matter stuck to the protection cover 2 is atomized and removed by the vibration as described with reference to FIG. 4. If foreign matter is removed from the protection cover 2 when vibrating the protection cover 2 with the foreign matter stuck thereon at the acceleration rate=about $2.0 \times 10^6$ m/s$^2$, the drive frequency is changed and the operation point shifts from the operation point 3 to the operation point 1. That is, the vibration mode is switched from the vibration mode S2 of the protection cover 2 with foreign matter stuck thereon to the vibration mode S1 of the protection cover 2 with no foreign matter stuck thereon.

The driving circuit 30 controls the vibration level of the protection cover 2 so that the vibration level is lower than the vibration level, on which the maximum displacement of the protection cover 2 is obtained (vibration level in vibration at a resonant frequency), and higher than or equal to the vibration level on which foreign matter stuck to the protection cover 2 can be removed. Thus, the driving circuit 30 controls the vibration level of the protection cover 2 by using the PID control circuit 36, being able to remove foreign matter stuck to the protection cover 2 in real time at low cost without performing image processing.

The cleaning device of the imaging unit 100 continuously maintains the vibration level of the protection cover 2 at a target vibration level irrespective of presence/absence of foreign matter stuck to the protection cover 2, as illustrated in FIG. 6. Further, the cleaning device of the imaging unit 100 vibrates the protection cover 2 on the minimal vibration level required to remove foreign matter, thus being able to increase the endurance time and lower the failure risk compared to vibrating the protection cover 2 at the resonant frequency of the maximum displacement.

As described above, the imaging unit 100 according to the first preferred embodiment includes the camera 5 and the cleaning device. The cleaning device includes the protection cover 2 that is in a viewing field of the camera 5, the piezoelectric material 15 that vibrates the protection cover 2, the driver circuit 31 that drives the piezoelectric material 15, the vibration sensor 70 that detects a signal related to the vibration level of the protection cover 2 vibrated with the piezoelectric material 15, and the driving circuit 30 that controls the driver circuit 31 based on a signal detected by the vibration sensor 70. The driving circuit 30 controls the driver circuit 31 so that a signal detected by the vibration sensor 70 matches a predetermined target value of the vibration level of the protection cover 2.

Accordingly, the cleaning device according to the first preferred embodiment can remove foreign matter in real time at low cost and increase the endurance time because the driving circuit 30 controls the driver circuit 31 so that a signal detected by the vibration sensor 70 matches a predetermined target value of the vibration level of the protection cover 2. Here, the vibration level of the light transmission body is preferably the acceleration rate of the light transmission body.

Further, the target value is preferably set to be lower than the vibration level on which the maximum displacement of the protection cover 2 is obtained at a frequency to drive and be higher than or equal to the vibration level on which foreign matter sticking to the protection cover 2 can be removed. Accordingly, the cleaning device can remove foreign matter sticking to the protection cover 2 in real time at low cost while increasing the endurance time and lowering the failure risk.

Furthermore, the target value is preferably, for example, the vibration level on which the acceleration rate of the protection cover 2 is about $1.5 \times 10^6$ m/s$^2$ or higher. Accordingly, the cleaning device can atomize and remove foreign matter sticking to the protection cover 2.

The driving circuit 30 preferably controls at least one of a voltage and a duty ratio of a drive signal used to drive the piezoelectric material 15 by the driver circuit 31. Accordingly, the cleaning device can adjust the vibration of the protection cover 2 so as to obtain the vibration level of a target value.

The vibration sensor 70 is preferably a sensor that detects a signal related to the vibration level of the protection cover 2, which is vibrated with the piezoelectric material 15, in a manner to be spaced from and not in contact with the piezoelectric material 15. Accordingly, the vibration sensor 70 can detect the vibration level of the protection cover 2 without affecting the vibration of the piezoelectric material 15. The vibration sensor 70 is preferably, for example, an ultrasonic sensor that detects acoustic waves generated by the vibration of the piezoelectric material 15.

Second Preferred Embodiment

Regarding the cleaning device according to the first preferred embodiment, the configuration thereof has been described in which the piezoelectric material 15 is continuously driven on the vibration level on which foreign matter stuck to the protection cover 2 can be atomized. Regarding a cleaning device according to a second preferred embodiment of the present invention, a configuration thereof will be described in which a piezoelectric material is driven at a lower vibration level until foreign matter sticks to a protection cover so as to further increase the endurance time. An imaging unit according to the second preferred embodiment has the same or substantially the same configuration as that of the imaging unit 100 illustrated in FIG. 1, and the same or corresponding components will be denoted by the same reference characters and detailed description thereof will not be repeated.

Figure 7:
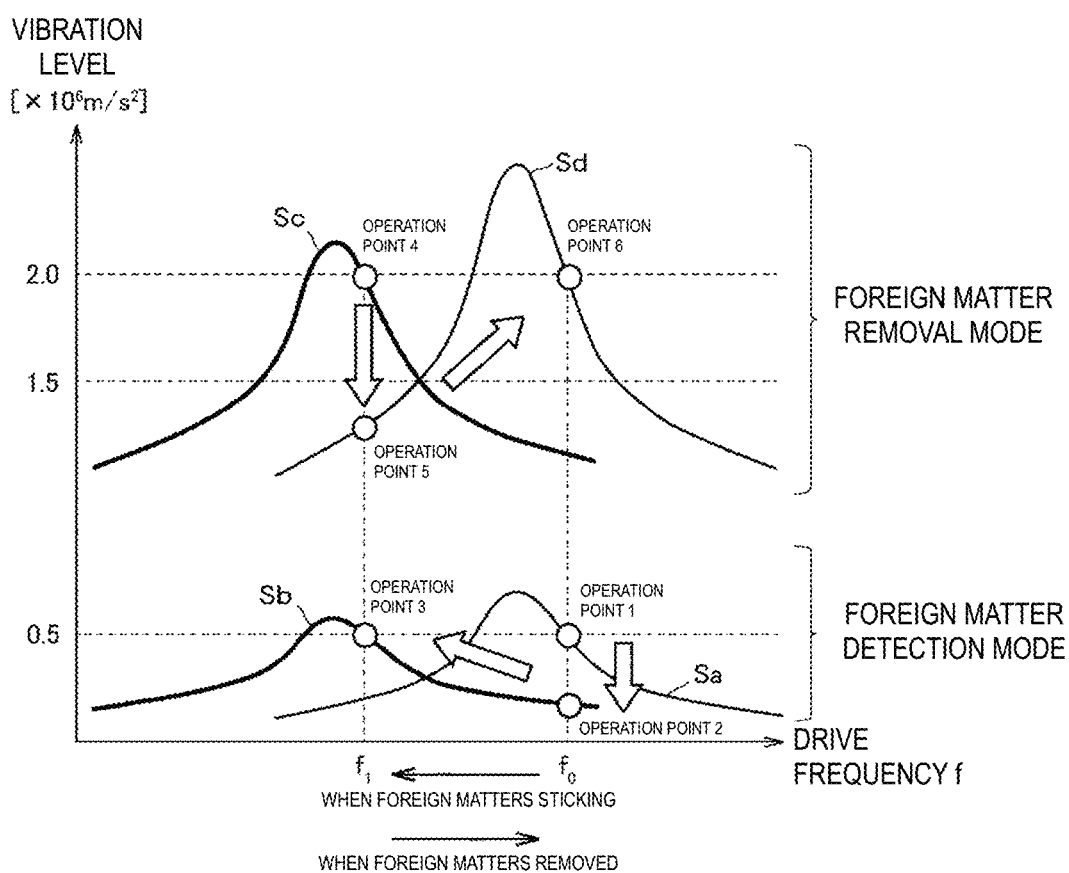
FIG. 7 is a drawing for explaining driving for removing foreign matter in two driving modes with a cleaning device of an imaging unit according to a second preferred embodiment of the present invention.

The cleaning device of the imaging unit 100 according to the second preferred embodiment drives the piezoelectric material 15 in a foreign matter detection mode until foreign matter sticks to the protection cover, and drives the piezoelectric material 15 in a foreign matter removal mode when foreign matter sticks to the protection cover. FIG. 7 is a drawing for explaining driving to remove foreign matter in two driving modes with the cleaning device of the imaging unit 100 according to the second preferred embodiment. In FIG. 7, the horizontal axis indicates a drive frequency f and the vertical axis indicates an acceleration rate (in units of $\times 10^6$ m/s$^2$) representing a vibration level.

In the example illustrated in FIG. 7, when no foreign matter sticks to the protection cover 2, driving is performed in the foreign matter detection mode in which the protection cover 2 is vibrated on the vibration level lower than the acceleration rate=about $1.5 \times 10^6$ m/s$^2$. Specifically, the protection cover 2 is vibrated with a target vibration level set to the acceleration rate=about $0.5 \times 10^6$ m/s$^2$, in the foreign matter detection mode. On an operation point 1 on which the protection cover 2 with no foreign matter stuck thereon is vibrated at the acceleration rate=about $0.5 \times 10^6$ m/s$^2$, the drive frequency $f_0$ is obtained.

If foreign matter sticks to the protection cover 2 when vibrating the protection cover 2 at the drive frequency $f_0$, the vibration level is lowered and the operation point shifts from the operation point 1 to an operation point 2. That is, the vibration mode is switched from a vibration mode Sa of the protection cover 2 with no foreign matter sticking thereon to a vibration mode Sb of the protection cover 2 with foreign matter stuck thereon.

The driving circuit 30 adjusts the amplitude voltage or the duty ratio D of the drive signal $V_{OUT}$, which is supplied from the driver circuit 31 to the piezoelectric material 15, so as to return the vibration of the protection cover 2, which is reduced to the vibration level of the operation point 2, to the acceleration rate=about $0.5 \times 10^6$ m/s$^2$ which is the target vibration level. Specifically, the PID control circuit 36 adjusts the frequency f to be inputted into the clock signal generation circuit 33 so as to obtain the target vibration level on the condition of the amplitude voltage or the duty ratio D of the drive signal $V_{OUT}$ that is designated by the mode switching circuit 37. On an operation point 3 on which the protection cover 2 having foreign matter stuck thereon is vibrated at the acceleration rate=about $0.5 \times 10^6$ m/s$^2$, the drive frequency is lowered from the drive frequency $f_0$ to be the drive frequency $f_1$.

The driving circuit 30 can detect the foreign matter stuck to the protection cover 2 with the PID control circuit 36 because of the lowering of the drive frequency from the drive frequency $f_0$ to the drive frequency $f_1$. When the driving circuit 30 detects the foreign matter stuck to the protection cover 2, the mode switching circuit 37 switches the driving mode from the foreign matter detection mode to the foreign matter removal mode. That is, in response to the switching to the foreign matter removal mode, the driving circuit 30 vibrates the protection cover 2 on the vibration level on which the acceleration rate=about $1.5 \times 10^6$ m/s$^2$ or higher is obtained. Specifically, the protection cover 2 is vibrated with a target vibration level set to the acceleration rate=about $2.0 \times 10^6$ m/s$^2$ in the foreign matter removal mode, in FIG. 7.

If the target vibration level is raised when vibrating the protection cover 2 at the drive frequency $f_1$, the operation point shifts from the operation point 3 to an operation point 4. That is, the vibration mode is switched from the vibration mode Sb of the protection cover 2 in the foreign matter detection mode to a vibration mode Sc of the protection cover 2 in the foreign matter removal mode.

When the protection cover 2 with foreign matter sticking thereon is vibrated at the acceleration rate=about $2.0 \times 10^6$ m/s², the foreign matter stuck to the protection cover 2 is atomized and removed by the vibration as described with reference to FIG. 4.

If the foreign matter is removed from the protection cover 2 when vibrating the protection cover 2 at the drive frequency $f_1$, the vibration level is lowered and the operation point shifts from the operation point 4 to an operation point 5. That is, the vibration mode is switched from the vibration mode Sc of the protection cover 2 with foreign matter stuck thereon to a vibration mode Sd of the protection cover 2 with no foreign matter stuck thereon. The driving circuit 30 adjusts the amplitude voltage or the duty ratio D of the drive signal $V_{OUT}$, which is supplied from the driver circuit 31 to the piezoelectric material 15, so as to return the vibration of the protection cover 2, which is reduced to the vibration level of the operation point 5, to the acceleration rate=about $2.0 \times 10^6$ m/s² which is the target vibration level. Specifically, the PID control circuit 36 adjusts the frequency f to be inputted into the clock signal generation circuit 33 so as to obtain the target vibration level on the condition of the amplitude voltage or the duty ratio D of the drive signal $V_{OUT}$ that is designated by the mode switching circuit 37. On an operation point 6 on which the protection cover 2, from which the foreign matter is removed, is vibrated at the acceleration rate=about $2.0 \times 10^6$ m/s², the drive frequency is raised from the drive frequency $f_1$ to the drive frequency $f_0$.

The driving circuit 30 can detect the removal of the foreign matter from the protection cover 2 with the PID control circuit 36 based on the increase in the drive frequency from the drive frequency $f_1$ to the drive frequency $f_0$. When the driving circuit 30 detects the removal of the foreign matter from the protection cover 2, the mode switching circuit 37 switches the driving mode from the foreign matter removal mode to the foreign matter detection mode.

Figure 8:
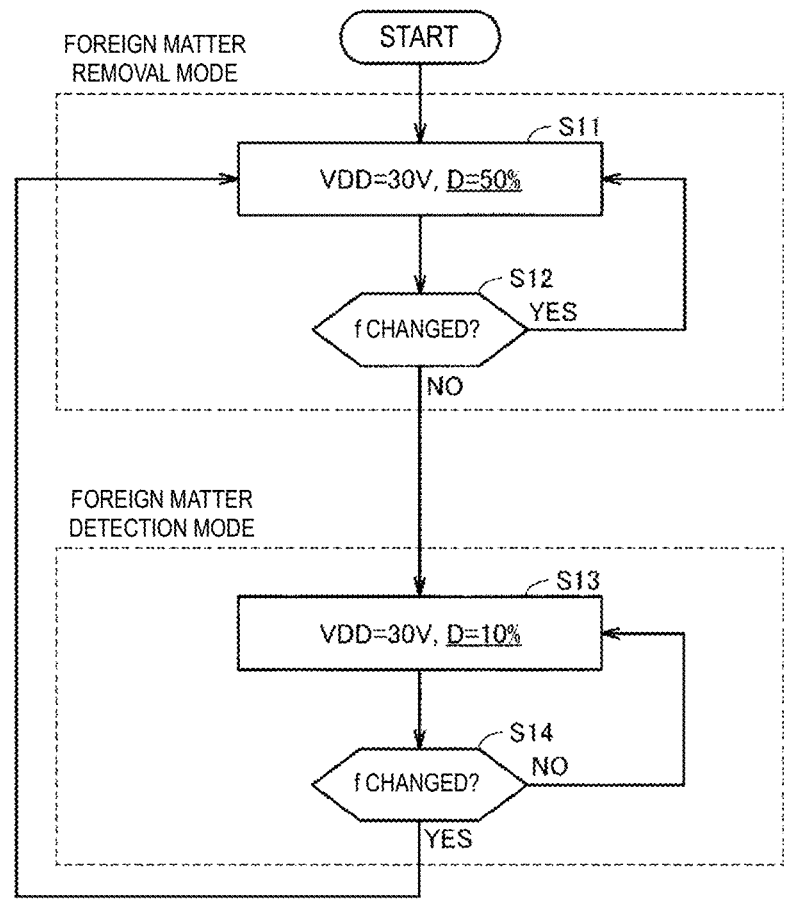
FIG. 8 is a flowchart for explaining driving of the cleaning device of the imaging unit according to the second preferred embodiment of the present invention.

The driving of the cleaning device in the imaging unit 100 according to the second preferred embodiment will now be described using a flowchart. FIG. 8 is a flowchart for explaining driving of the cleaning device of the imaging unit 100 according to the second preferred embodiment. First, at the start of driving, the cleaning device of the imaging unit 100 is driven once in the foreign matter removal mode irrespective of whether or not foreign matter is stuck to the protection cover 2. Accordingly, even when foreign matter sticks to the protection cover 2, driving in the foreign matter detection mode can be performed after removing the foreign matter stuck to the protection cover 2, thus being able to prevent a malfunction of the cleaning device of the imaging unit 100 caused by erroneously determining as a normal state, a state in which foreign matter sticks to the protection cover 2.

For the driving in the foreign matter removal mode, the driving circuit 30 respectively adjusts the amplitude voltage VDD and the duty ratio D of the drive signal $V_{OUT}$ to about 30 V and about 50% and supplies the drive signal $V_{OUT}$ from the driver circuit 31 to the piezoelectric material 15 (step S11). That is, the driving circuit 30 vibrates the protection cover 2 on the vibration level of the acceleration rate=about $2.0 \times 10^6$ m/s². The driving circuit 30 determines whether or not the drive frequency f is changed (step S12). When the drive frequency f is changed (YES in step S12), the driving circuit 30 determines that foreign matter sticking to the protection cover 2 is not completely removed and the driving circuit 30 returns the processing to step S11 to keep the protection cover 2 vibrating on the vibration level of the acceleration rate=about $2.0 \times 10^6$ m/s².

When the drive frequency f is not changed (NO in step S12), the driving circuit 30 determines that the foreign matter sticking to the protection cover 2 has been completely removed and respectively adjusts the amplitude voltage VDD and the duty ratio D of the drive signal $V_{OUT}$ to about 30 V and about 10% to supply the drive signal $V_{OUT}$ from the driver circuit 31 to the piezoelectric material 15, for the driving in the foreign matter detection mode (step S13). That is, the driving circuit 30 vibrates the protection cover 2 on the vibration level of the acceleration rate=about $0.5 \times 10^6$ m/s². In the flowchart shown in FIG. 8, the duty ratio D is adjusted to control the vibration level of the protection cover 2. However, for example, the vibration level of the protection cover 2 may be controlled by adjusting the amplitude voltage VDD or the vibration level of the protection cover 2 may be controlled by adjusting the amplitude voltage VDD and the duty ratio D.

The driving circuit 30 determines whether or not the drive frequency f is changed (step S14). When the drive frequency f is changed (YES in step S14), the driving circuit 30 determines that foreign matter sticks to the protection cover 2 and the driving circuit 30 returns the processing to step S11 to switch the driving to the one in the foreign matter removal mode and vibrate the protection cover 2 on the vibration level of the acceleration rate=about $2.0 \times 10^6$ m/s². Here, the drive frequency f is changed also depending on an ambient temperature. Therefore, determination is preferably performed depending on a temporal change amount of the frequency so as to distinguish the frequency change caused by foreign matter removal from the frequency change caused by the ambient temperature. For example, a resonant frequency can be lowered by about 100 Hz in a short period of time when about 10 μl of water droplets is removed, but there is no sharp temperature change that causes about 100 Hz of frequency change within about 10 seconds. Therefore, the driving circuit 30 may determine that the frequency change is caused by foreign matter removal when the temporal change amount of the drive frequency f is larger than or equal to about 10 Hz/sec, for example.

When the drive frequency f is not changed (NO in step S14), the driving circuit 30 returns the processing to step S13 to keep the protection cover 2 vibrating on the vibration level of the acceleration rate=about $0.5 \times 10^6$ m/s², for example. That is, the driving circuit 30 continues the driving in the foreign matter detection mode. Here, when the driving circuit 30 receives interruption processing to end the operation of the cleaning device, the driving circuit 30 ends the operation of the cleaning device.

Thus, the driving circuit 30 is capable of increasing the endurance time as can be seen from the graph R of FIG. 5 by performing the driving in the foreign matter detection mode in which the vibration level of the protection cover 2 is lower than that in the driving in the foreign matter removal mode. Specifically, the description will be provided below about how much the endurance time can be increased by increasing the driving in the foreign matter detection mode.

Figure 9:
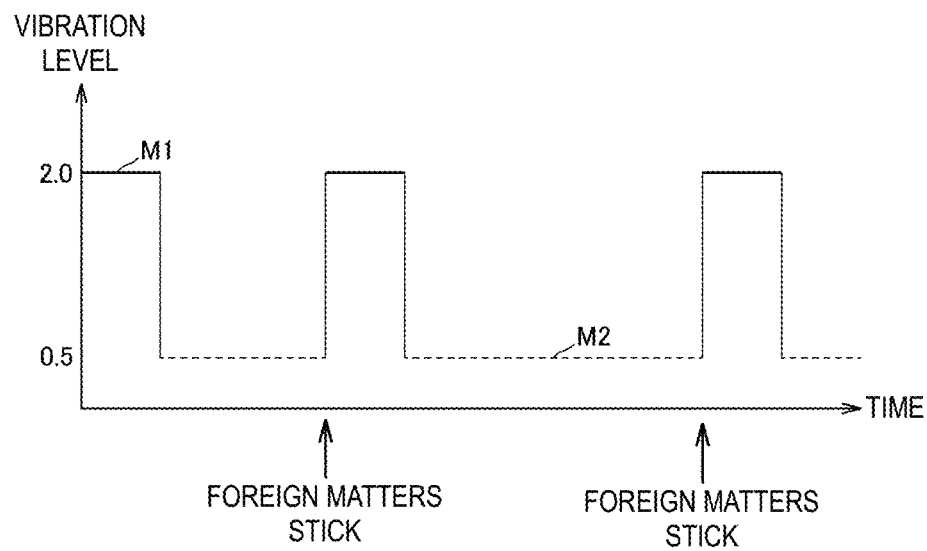
FIG. 9 is a drawing for explaining temporal change of a driving level of the cleaning device in the imaging unit according to the second preferred embodiment of the present invention.

FIG. 9 is a drawing for explaining temporal change of a driving level of the cleaning device in the imaging unit according to the second preferred embodiment. In FIG. 9, the horizontal axis indicates time and the vertical axis indicates an acceleration rate (in units of $\times 10^6$ m/s²) representing a vibration level. FIG. 9 defines a period in which foreign matter sticks to the protection cover 2 and driving is performed in the foreign matter removal mode, as a period M1, and a period in which no foreign matter sticks to the protection cover 2 and driving is performed in the foreign matter detection mode, as a period M2.

The entire period for driving the cleaning device is expressed as period M1+period M2 and therefore, a repetition rate X of the foreign matter removal mode can be expressed as period M1/(period M1+period M2)×100 (in %). That is, the higher repetition rate X of the foreign matter removal mode represents the longer period to be driven in the foreign matter removal mode and represents the longer period to vibrate the protection cover 2 on the higher vibration level.

Figure 10:
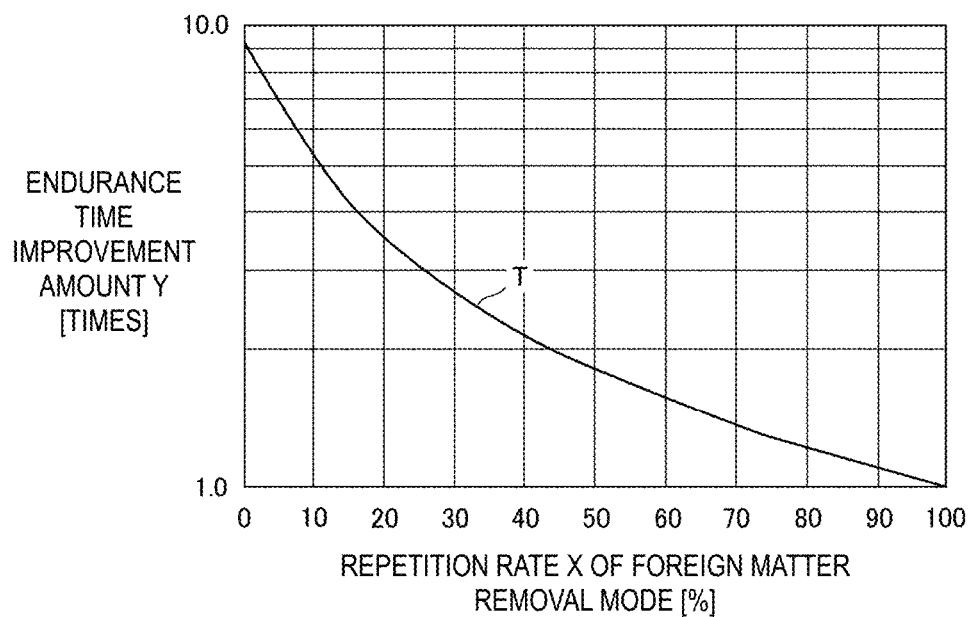
FIG. 10 is a drawing for explaining endurance time improvement of the cleaning device in the imaging unit according to the second preferred embodiment of the present invention.

FIG. 10 is a drawing for explaining endurance time improvement of the cleaning device in the imaging unit according to the second preferred embodiment. In FIG. 10, the horizontal axis indicates the repetition rate X (in %) of the foreign matter removal mode and the vertical axis indicates an endurance time improvement amount Y. The graph T in FIG. 10 illustrates that the endurance time improvement amount Y is lowered if the repetition rate X of the foreign matter removal mode is raised.

In FIG. 10, the vibration level in the foreign matter detection mode is set to the acceleration rate=about $0.5 \times 10^6$ m/s$^2$ and the vibration level in the foreign matter removal mode is set to the acceleration rate=about $2.0 \times 10^6$ m/s$^2$, for example. The endurance time obtained when the vibration level is set to the acceleration rate=about $0.5 \times 10^6$ m/s$^2$ (on the environmental conditions that the ambient temperature is about 85° C. and the humidity is about 85%) is about 20875 hours, while the endurance time obtained when the vibration level is set to the acceleration rate=about $2.0 \times 10^6$ m/s$^2$ is about 2213 hours. Therefore, if the improvement amount Y obtained when the cleaning device is driven in the foreign matter removal mode during the entire period (the repetition rate X of the foreign matter removal mode=about 100%) is defined as 1 time, the improvement amount Y obtained when the cleaning device is driven in the foreign matter detection mode during the entire period (the repetition rate X of the foreign matter removal mode=0%) is about 9.4 times, for example.

For example, the Hokuriku area, having many rainy days, in Japan has rain or snow about half of a year (about 180 days). In the Hokuriku area, if the repetition rate X of the foreign matter removal mode=about 50% or lower is set in FIG. 10, the endurance time can be increased at least twice as long as the case where the cleaning device is driven in the foreign matter removal mode in the entire period.

As described above, in the cleaning device of the imaging unit 100 according to the second preferred embodiment, the target value includes the first target value (the vibration level in the foreign matter detection mode, for example) and the second target value that is a higher vibration level than the first target value (the vibration level in the foreign matter removal mode, for example). The driving circuit 30 is capable of switching the foreign matter detection mode and the foreign matter removal mode. In the foreign matter detection mode, the driver circuit 31 is controlled so that a signal detected by the vibration sensor 70 matches the first target value. In the foreign matter removal mode, the driver circuit 31 is controlled so that a signal detected by the vibration sensor 70 matches the second target value. The driving circuit 30 performs switching to the foreign matter removal mode if a frequency for driving the piezoelectric material 15 is lowered when controlling the driver circuit 31 in the foreign matter detection mode.

Thus, as the cleaning device according to the second preferred embodiment performs switching to the foreign matter removal mode when foreign matter sticks to the protection cover 2, the endurance time can be further increased and lowering the failure risk. At the same time, foreign matter stuck to the protection cover 2 can be removed in real time at low cost.

Specifically, the first target value is preferably the vibration level on which the acceleration rate of the protection cover 2 is below about $1.5 \times 10^6$ m/s$^2$ and the second target value is preferably the vibration level on which the acceleration rate of the protection cover 2 is about $1.5 \times 10^6$ m/s$^2$ or higher, for example.

In the control method for the cleaning device according to the second preferred embodiment, the driving circuit 30 drives the piezoelectric material 15 in the foreign matter detection mode in which the driver circuit 31 is controlled so that a signal detected by the vibration sensor 70 matches the first target value. The driving circuit 30 determines whether or not a frequency to drive the piezoelectric material 15 is lowered when controlling the driver circuit 31 in the foreign matter detection mode. The driving circuit 30 drives the piezoelectric material 15 in the foreign matter removal mode in which the driver circuit 31 is controlled so that a signal detected by the vibration sensor 70 matches the second target value, which is a higher vibration level than the first target value, when the frequency to drive the piezoelectric material 15 is lowered. The driving circuit 30 returns the driving of the piezoelectric material 15 to the foreign matter detection mode in a case where the frequency to drive the piezoelectric material 15 is returned to a frequency of the foreign matter detection mode when controlling the driver circuit 31 in the foreign matter removal mode. The driving circuit 30 switches the mode to the foreign matter removal mode in a case where the frequency for driving the piezoelectric material 15 is lowered when controlling the driver circuit 31 in the foreign matter detection mode.

It is preferable that the driving of the piezoelectric material 15 is started from the foreign matter removal mode irrespective of whether or not foreign matter sticks to the protection cover 2.

Third Preferred Embodiment

Regarding the cleaning device according to the second preferred embodiment, a description has been provided in which foreign matter stuck to the protection cover 2 is removed by raising the vibration level of the protection cover 2 in the foreign matter removal mode. However, foreign matter stuck to the protection cover 2 is not limited to water droplets such as raindrops, and examples of foreign matter also include mud, dust, and the like. Therefore, foreign matter stuck to the protection cover 2 sometimes cannot be removed even by vibrating the protection cover 2 at the vibration level in the foreign matter removal mode. For a cleaning device according to a third preferred embodiment of the present invention, the configuration thereof will be described in which the protection cover 2 is vibrated at a higher vibration level in a case where foreign matter stuck to the protection cover 2 cannot be removed. An imaging unit according to the third preferred embodiment has the same or substantially the same configuration as that of the imaging unit 100 illustrated in FIG. 1, and the same or corresponding components will be denoted by the same reference characters and detailed description thereof will not be repeated.

Figure 11:
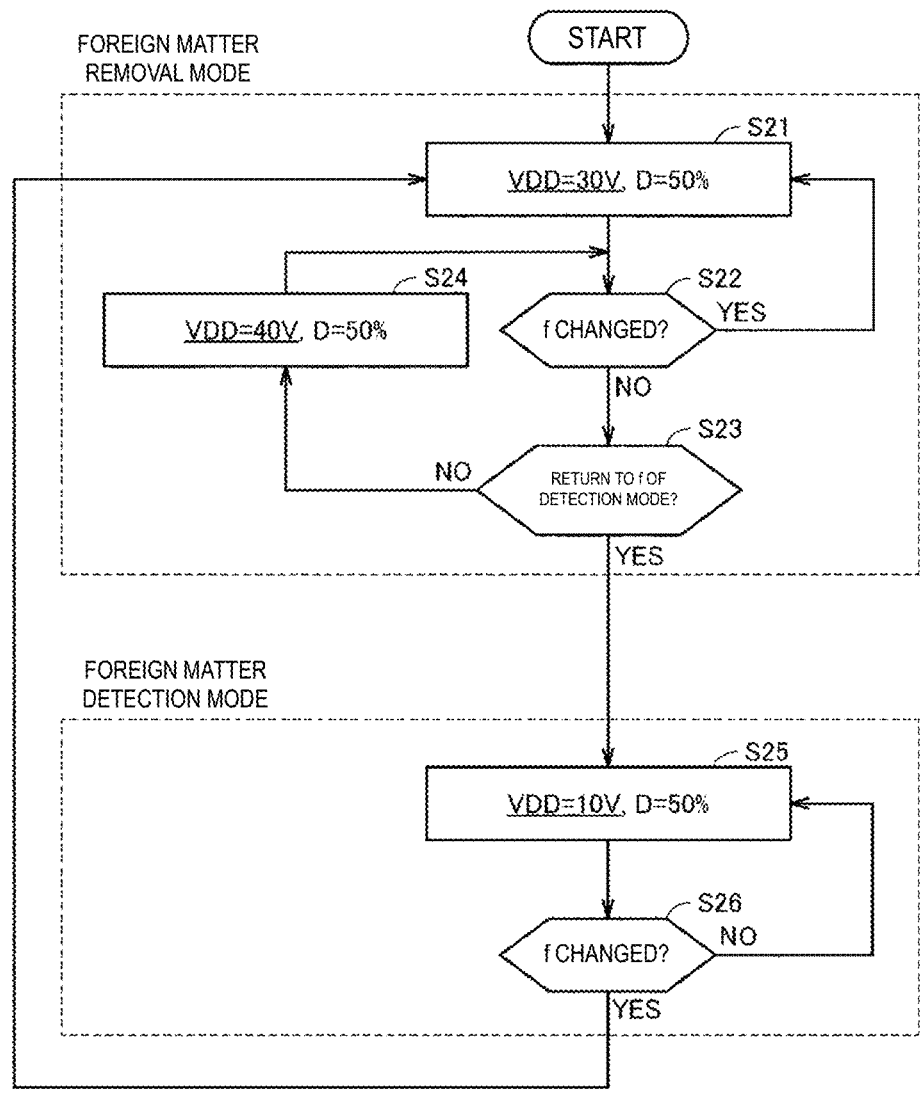
FIG. 11 is a flowchart for explaining driving of a cleaning device of an imaging unit according to a third preferred embodiment of the present invention.

The driving of the cleaning device in the imaging unit 100 according to the third preferred embodiment will now be described using a flowchart. FIG. 11 is a flowchart for explaining driving of the cleaning device of the imaging unit 100 according to the third preferred embodiment. First, at the start of driving, the cleaning device of the imaging unit 100 is driven once in the foreign matter removal mode irrespective of whether or not foreign matter sticks to the protection cover 2.

For the driving in the foreign matter removal mode, the driving circuit 30 respectively adjusts the amplitude voltage VDD and the duty ratio D of the drive signal $V_{OUT}$ to about 30 V and about 50%, for example, and supplies the drive signal $V_{OUT}$ from the driver circuit 31 to the piezoelectric material 15 (step S21). That is, the driving circuit 30 vibrates the protection cover 2 on the vibration level of the acceleration rate=about $2.0 \times 10^6$ m/s$^2$, for example. The driving circuit 30 determines whether or not the drive frequency f is changed (step S22). When the drive frequency f is changed (YES in step S22), the driving circuit 30 determines that foreign matter sticking to the protection cover 2 is not completely removed and the driving circuit 30 returns the processing to step S21 to keep the protection cover 2 vibrating on the vibration level of the acceleration rate=about $2.0 \times 10^6$ m/s$^2$, for example.

When the drive frequency f is not changed (NO in step S22), the driving circuit 30 determines whether or not the drive frequency f is returned to the drive frequency for the driving in the foreign matter detection mode (step S23). When the drive frequency f is not returned to the drive frequency for the driving in the foreign matter detection mode (NO in step S23), the driving circuit 30 determines that the foreign matter sticking to the protection cover 2 has not been able to be completely removed and vibrates the protection cover 2 at the higher vibration level (a third target value).

In order to vibrate the protection cover 2 at the higher vibration level, the driving circuit 30 respectively adjusts the amplitude voltage VDD and the duty ratio D of the drive signal $V_{OUT}$ to about 40 V and about 50%, for example, and supplies the drive signal $V_{OUT}$ from the driver circuit 31 to the piezoelectric material (step S24). That is, the driving circuit 30 vibrates the protection cover 2 at the vibration level of the acceleration rate=about $2.5 \times 10^6$ m/s$^2$, for example. In the flowchart shown in FIG. 11, the amplitude voltage VDD is adjusted to control the vibration level of the protection cover 2. However, the vibration level of the protection cover 2 may be controlled by adjusting the duty ratio D or the vibration level of the protection cover 2 may be controlled by adjusting the amplitude voltage VDD and the duty ratio D.

When the drive frequency f is returned to the drive frequency for the driving in the foreign matter detection mode (YES in step S23), the driving circuit 30 determines that the foreign matter previously stuck to the protection cover 2 has been completely removed and respectively adjusts the amplitude voltage VDD and the duty ratio D of the drive signal $V_{OUT}$ to about 10 V and about 50%, for example, to supply the drive signal $V_{OUT}$ from the driver circuit 31 to the piezoelectric material 15, for the driving in the foreign matter detection mode (step S25). That is, the driving circuit 30 vibrates the protection cover 2 at the vibration level of the acceleration rate=about $0.5 \times 10^6$ m/s$^2$, for example.

The driving circuit 30 determines whether or not the drive frequency f is changed (step S26). When the drive frequency f is changed (YES in step S26), the driving circuit 30 determines that foreign matter sticks to the protection cover 2 and the driving circuit 30 returns the processing to step S21 to switch the driving to the one in the foreign matter removal mode and vibrate the protection cover 2 on the vibration level of the acceleration rate=about $2.0 \times 10^6$ m/s$^2$, for example. Here, the drive frequency f is changed also depending on an ambient temperature. Therefore, determination is preferably performed depending on a temporal change amount of the frequency so as to distinguish the frequency change caused by foreign matter removal from the frequency change caused by the ambient temperature.

When the drive frequency f is not changed (NO in step S26), the driving circuit 30 returns the processing to step S25 to keep the protection cover 2 vibrating on the vibration level of the acceleration rate=about $0.5 \times 10^6$ m/s$^2$, for example. That is, the driving circuit 30 continues the driving in the foreign matter detection mode. Here, when the driving circuit 30 receives interruption processing to end the operation of the cleaning device, the driving circuit 30 ends the operation of the cleaning device.

As described above, in the cleaning device according to the third preferred embodiment, the target value further includes the third target value (the vibration level of step S24, for example) that is a higher vibration level than the second target value (the vibration level in the foreign matter removal mode, for example). The driving circuit 30 controls the driver circuit 31 so that a signal detected by the vibration sensor 70 matches the third target value in the case where the frequency to drive the piezoelectric material 15 is not returned to the frequency of the foreign matter detection mode even by controlling the driver circuit 31 so that the signal detected by the vibration sensor 70 matches the second target value.

Thus, the cleaning device according to the third preferred embodiment vibrates the protection cover 2 at a higher vibration level so as to remove foreign matter, which cannot be removed at the vibration level in the foreign matter removal mode, thus achieving improved cleaning performance.

Fourth Preferred Embodiment

Concerning the cleaning device according to the third preferred embodiment, the configuration thereof has been described in which the protection cover 2 is vibrated at a higher vibration level when foreign matter stuck to the protection cover 2 cannot be removed. For a cleaning device according to a fourth preferred embodiment of the present invention, a configuration thereof will be described in which a discharger to discharge cleaning liquid to a protection cover is provided so as to remove foreign matter stuck to the protection cover with the cleaning liquid.

Figure 12:
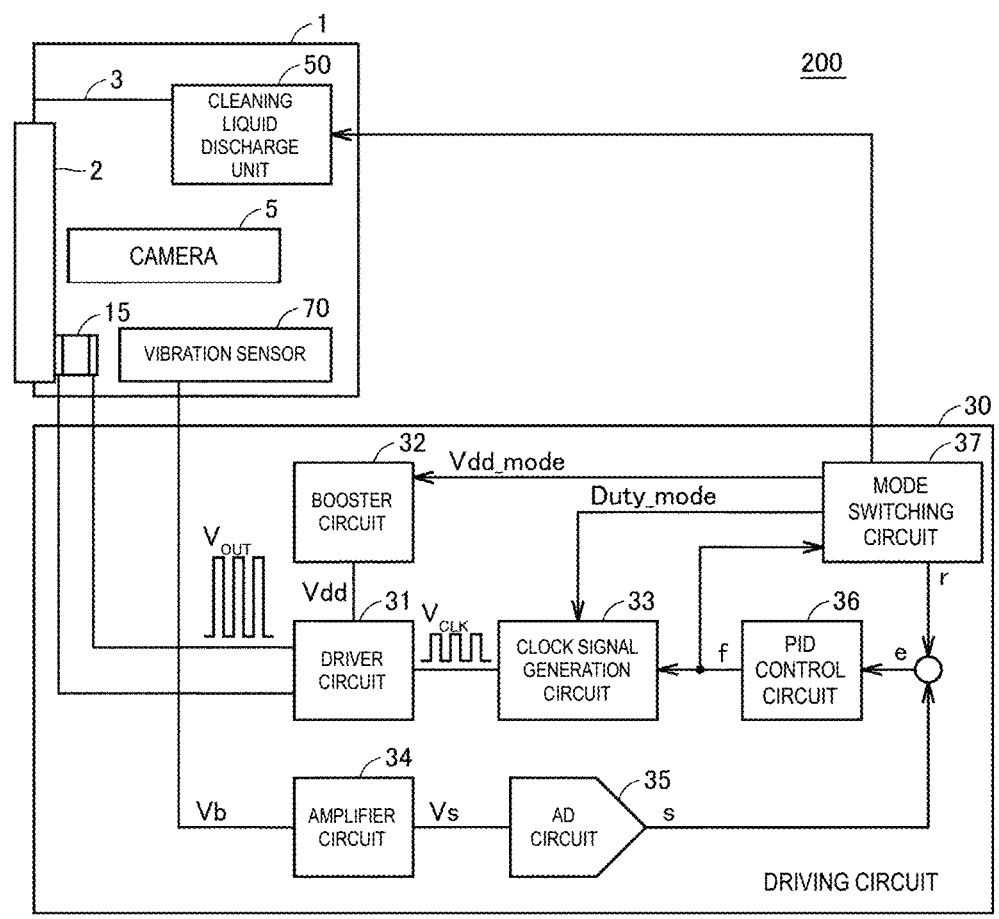
FIG. 12 is a block diagram for explaining a cleaning device of an imaging unit according to a fourth preferred embodiment of the present invention.

FIG. 12 is a block diagram for explaining a cleaning device of an imaging unit 200 according to the fourth preferred embodiment. In the imaging unit 200 illustrated in FIG. 12, the same or corresponding components as those of the imaging unit 100 illustrated in FIG. 1 are denoted by the same reference characters and detailed description thereof will not be repeated. The imaging unit 200 includes the casing 1, the protection cover 2, the camera 5, the piezoelectric material 15, the driving circuit 30, a cleaning liquid discharger 50, and the vibration sensor 70. Here, the protection cover 2, the piezoelectric material 15, the driving circuit 30, the cleaning liquid discharger 50, and the vibration sensor 70, excluding the camera 5 from the imaging unit 200, define a cleaning device to clean off foreign matter (deposits) sticking in an imaging range of the camera 5.

The casing 1 includes a cleaning nozzle 3 that includes an opening portion to discharge cleaning liquid to the protection cover 2. The cleaning nozzle 3 is supplied with cleaning liquid from the cleaning liquid discharger 50, which is provided on the opposite side to the opening portion, and discharges the cleaning liquid to an end portion of the protection cover 2. The head of the cleaning nozzle 3 is disposed outside of the imaging range (viewing field) of the camera 5 and is not at the position on which the cleaning nozzle 3 appears in an image of the camera 5. FIG. 12 illustrates the configuration in which one cleaning nozzle 3 is provided to the casing 1, but a plurality of cleaning nozzles 3 may be provided to the casing 1.

The cleaning liquid discharger 50 discharges cleaning liquid from the opening portion of the cleaning nozzle 3. The cleaning liquid discharger 50 performs control to discharge cleaning liquid to the protection cover 2 based on a control signal from the mode switching circuit 37. Cleaning liquid is thus discharged to the protection cover 2 with the cleaning liquid discharger 50, being able to remove foreign matter such as mud and dust that cannot be removed from the protection cover 2 even by vibrating the protection cover 2 in the foreign matter removal mode. Here, cleaning liquid discharged to the protection cover 2 is not limited to one type, but the cleaning liquid discharger 50 may discharge a plurality of types of cleaning liquid having mutually-different detergency to the protection cover 2.

Figure 13:
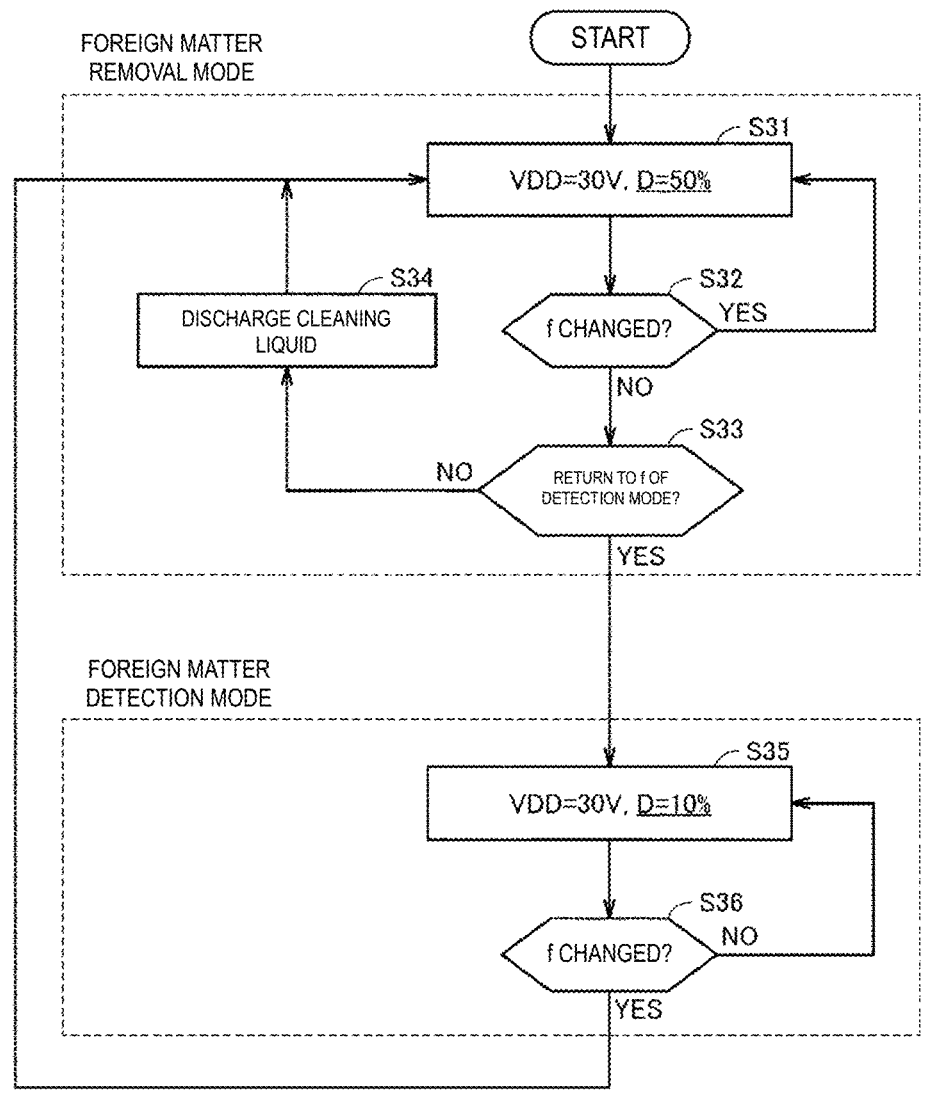
FIG. 13 is a flowchart for explaining driving of the cleaning device of the imaging unit according to the fourth preferred embodiment of the present invention.

The driving of the cleaning device in the imaging unit 200 according to the fourth preferred embodiment will now be described using a flowchart. FIG. 13 is a flowchart for explaining driving of the cleaning device of the imaging unit 200 according to the fourth preferred embodiment. First, at the start of driving, the cleaning device of the imaging unit 200 is driven once in the foreign matter removal mode irrespective of whether or not foreign matter sticks to the protection cover 2.

For the driving in the foreign matter removal mode, the driving circuit 30 respectively adjusts the amplitude voltage VDD and the duty ratio D of the drive signal $V_{OUT}$ to about 30V and about 50%, for example, and supplies the drive signal $V_{OUT}$ from the driver circuit 31 to the piezoelectric material 15 (step S31). That is, the driving circuit 30 vibrates the protection cover 2 on the vibration level of the acceleration rate=about $2.0 \times 10^6$ m/s$^2$, for example. The driving circuit 30 determines whether or not the drive frequency f is changed (step S32). When the drive frequency f is changed (YES in step S32), the driving circuit 30 determines that foreign matter sticking to the protection cover 2 is not completely removed and the driving circuit 30 returns the processing to step S31 to keep the protection cover 2 vibrating on the vibration level of the acceleration rate=about $2.0 \times 10^6$ m/s$^2$, for example.

When the drive frequency f is not changed (NO in step S32), the driving circuit 30 determines whether or not the drive frequency f is returned to the drive frequency for the driving in the foreign matter detection mode (step S33). When the drive frequency f is not returned to the drive frequency for the driving in the foreign matter detection mode (NO in step S33), the driving circuit 30 causes the cleaning liquid discharger 50 to discharge cleaning liquid to the protection cover 2 (step S34). After discharging the cleaning liquid to the protection cover 2 in step S34, the driving circuit 30 returns the processing to step S31 to vibrate the protection cover 2 at the vibration level of the acceleration rate=about $2.0 \times 10^6$ m/s$^2$, for example.

When the drive frequency f is returned to the drive frequency for the driving in the foreign matter detection mode (YES in step S33), the driving circuit 30 determines that the foreign matter previously stuck to the protection cover 2 has been completely removed and respectively adjusts the amplitude voltage VDD and the duty ratio D of the drive signal $V_{OUT}$ to about 30 V and about 10%, for example, to supply the drive signal $V_{OUT}$ from the driver circuit 31 to the piezoelectric material 15, for the driving in the foreign matter detection mode (step S35). That is, the driving circuit 30 vibrates the protection cover 2 at the vibration level of the acceleration rate=about $0.5 \times 10^6$ m/s$^2$, for example. In the flowchart shown in FIG. 13, the duty ratio D is adjusted to control the vibration level of the protection cover 2. However, the vibration level of the protection cover 2 may be controlled by adjusting the amplitude voltage VDD or the vibration level of the protection cover 2 may be controlled by adjusting the amplitude voltage VDD and the duty ratio D.

The driving circuit 30 determines whether or not the drive frequency f is changed (step S36). When the drive frequency f is changed (YES in step S36), the driving circuit 30 determines that foreign matter is stuck to the protection cover 2 and the driving circuit 30 returns the processing to step S31 to switch the driving to the one in the foreign matter removal mode and vibrate the protection cover 2 on the vibration level of the acceleration rate=about $2.0 \times 10^6$ m/s$^2$, for example. Here, the drive frequency f is also changed depending on an ambient temperature. Therefore, determination is preferably performed depending on a temporal change amount of the frequency so as to distinguish the frequency change caused by foreign matter removal from the frequency change caused by the ambient temperature.

When the drive frequency f is not changed (NO in step S36), the driving circuit 30 returns the processing to step S35 to keep the protection cover 2 vibrating on the vibration level of the acceleration rate=about $0.5 \times 10^6$ m/s$^2$, for example. That is, the driving circuit 30 continues the driving in the foreign matter detection mode. Here, when the driving circuit 30 receives interruption processing to end the operation of the cleaning device, the driving circuit 30 ends the operation of the cleaning device.

As described above, the cleaning device according to the fourth preferred embodiment further includes the cleaning liquid discharger 50 to discharge cleaning liquid (cleaning material) to the surface of the protection cover 2. The driving circuit 30 causes the cleaning liquid discharger 50 to discharge cleaning liquid (cleaning material) in the case where the frequency to drive the piezoelectric material 15 is not returned to the frequency of the foreign matter detection mode even by controlling the driver circuit 31 so that a signal detected by the vibration sensor 70 matches the second target value.

Thus, the cleaning device according to the fourth preferred embodiment discharges cleaning liquid to the surface of the protection cover 2 with the cleaning liquid discharger 50 so as to remove foreign matter that cannot be removed at the vibration level in the foreign matter removal mode, thus achieving improved cleaning performance.

Fifth Preferred Embodiment

Concerning the cleaning devices of the above-mentioned preferred embodiments, a description has been provided regarding the control to remove foreign matter stuck to the protection cover 2. For a cleaning device according to a fifth preferred embodiment of the present invention, the configuration thereof will be described in which, in a case where foreign matter stuck to the protection cover 2 cannot be removed, a user is notified of the state.

Figure 14:
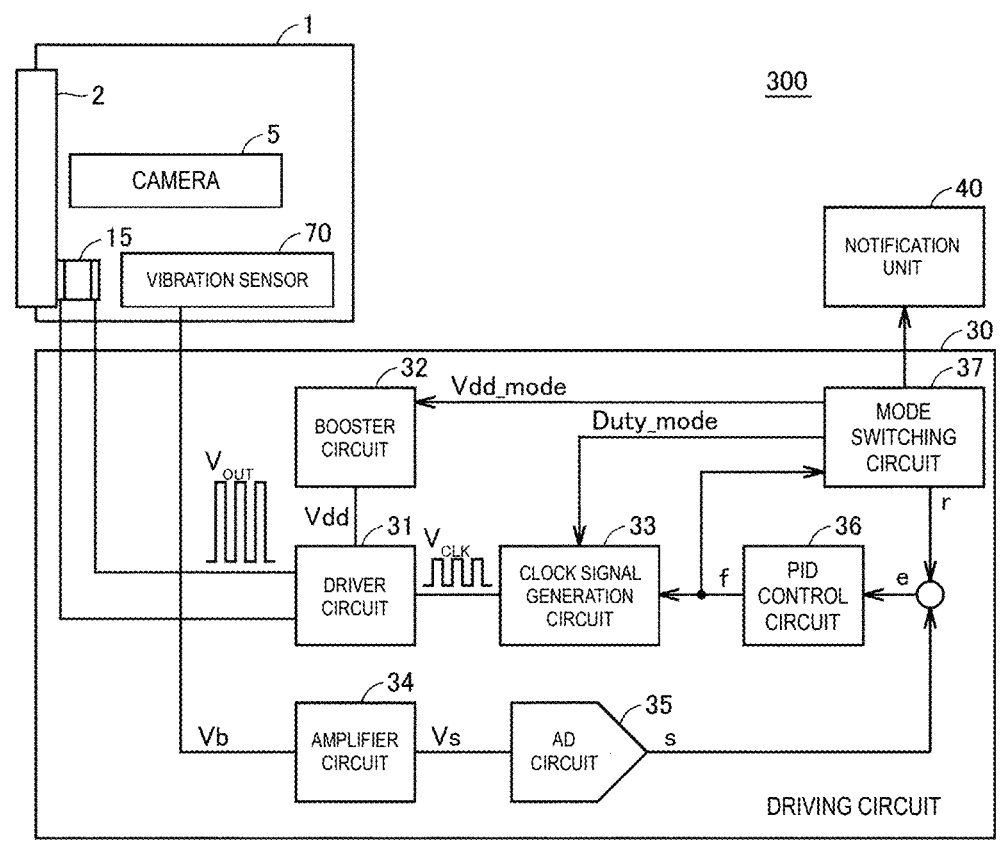
FIG. 14 is a block diagram for explaining a cleaning device of an imaging unit according to a fifth preferred embodiment of the present invention.

FIG. 14 is a block diagram for explaining a cleaning device of an imaging unit 300 according to the fifth preferred embodiment. In the imaging unit 300 illustrated in FIG. 14, the same or corresponding components as those of the imaging unit 100 illustrated in FIG. 1 are denoted by the same reference characters and detailed description thereof will not be repeated. The imaging unit 300 includes the casing 1, the protection cover 2, the camera 5, the piezoelectric material 15, the driving circuit 30, a notifier 40, and the vibration sensor 70. Here, the protection cover 2, the piezoelectric material 15, the driving circuit 30, the notifier 40, and the vibration sensor 70, excluding the camera 5 of the imaging unit 300, define a cleaning device to clean off foreign matter (deposits) present in an imaging range of the camera 5.

When foreign matter stuck to the protection cover 2 cannot be removed even by performing control to remove the foreign matter, the notifier 40 provides a notification that the foreign matter cannot be removed, based on a control signal from the mode switching circuit 37. Specifically, the notifier 40 is a speaker, a light emitting element, a display device, or the like, for example. If the notifier 40 is a speaker, the notifier 40 notifies a user of a state in which foreign matter cannot be removed with a buzzer sound. If the notifier 40 is a light emitting element, the notifier 40 notifies a user of a state in which foreign matter cannot be removed with a red light emission.

Figure 15:
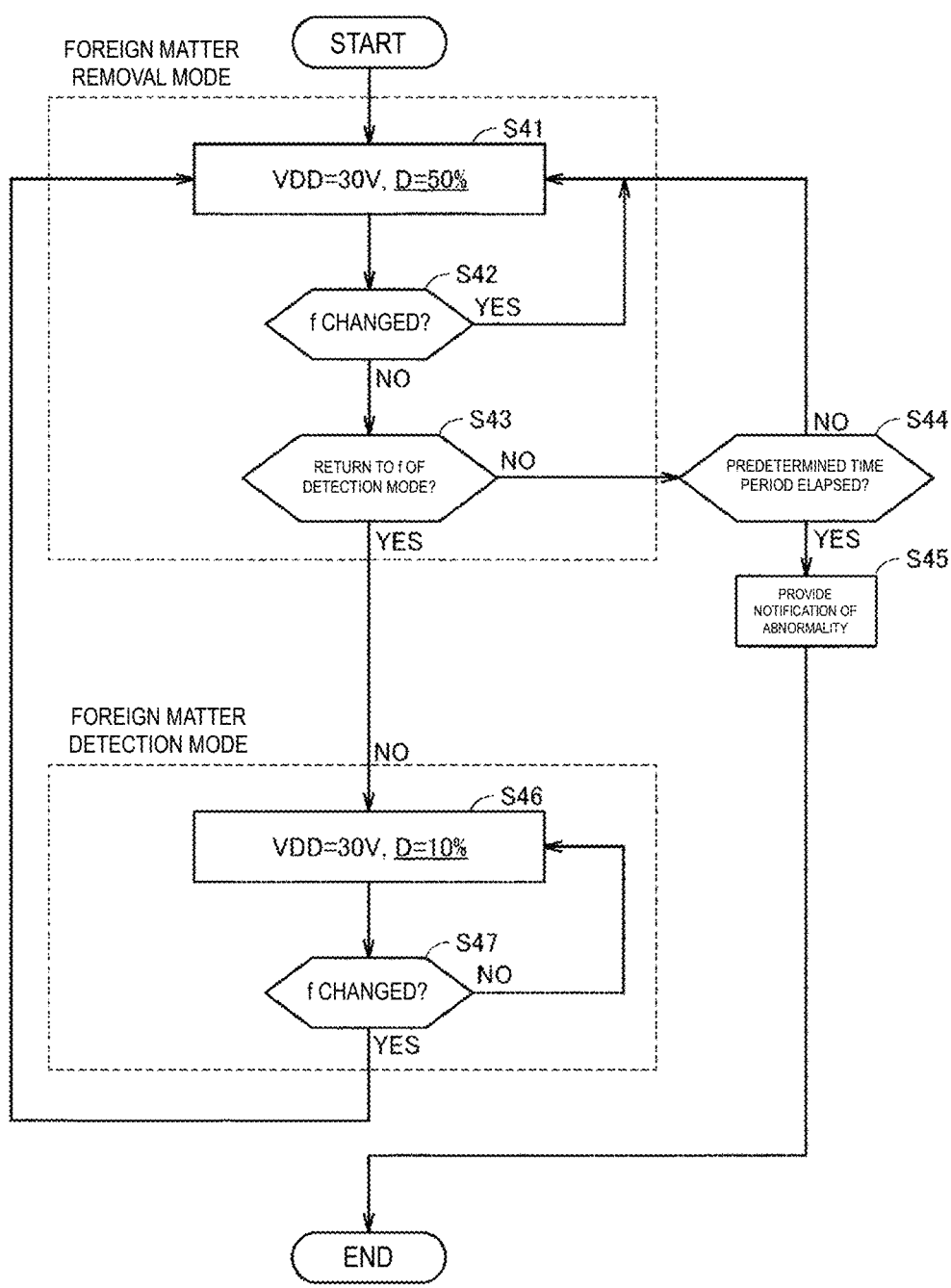
FIG. 15 is a flowchart for explaining driving of the cleaning device of the imaging unit according to the fifth preferred embodiment of the present invention.

The driving of the cleaning device in the imaging unit 300 according to the fifth preferred embodiment will now be described using a flowchart. FIG. 15 is a flowchart for explaining driving of the cleaning device of the imaging unit 300 according to the fifth preferred embodiment. First, at the start of driving, the cleaning device of the imaging unit 300 is driven once in the foreign matter removal mode irrespective of whether or not foreign matter sticks to the protection cover 2.

For the driving in the foreign matter removal mode, the driving circuit 30 respectively adjusts the amplitude voltage VDD and the duty ratio D of the drive signal $V_{OUT}$ to about 30 V and about 50%, for example, and supplies the drive signal $V_{OUT}$ from the driver circuit 31 to the piezoelectric material 15 (step S41). That is, the driving circuit 30 vibrates the protection cover 2 on the vibration level of the acceleration rate=about $2.0 \times 10^6$ m/s$^2$, for example. The driving circuit 30 determines whether or not the drive frequency f is changed (step S42). When the drive frequency f is changed (YES in step S42), the driving circuit 30 determines that foreign matter sticking to the protection cover 2 is not completely removed and the driving circuit 30 returns the processing to step S41 to keep the protection cover 2 vibrating on the vibration level of the acceleration rate=about $2.0 \times 10^6$ m/s$^2$, for example.

When the drive frequency f is not changed (NO in step S42), the driving circuit 30 determines whether or not the drive frequency f is returned to the drive frequency for the driving in the foreign matter detection mode (step S43). When the drive frequency f is not returned to the drive frequency for the driving in the foreign matter detection mode (NO in step S43), the driving circuit 30 determines whether or not a predetermined time has elapsed in the driving in the foreign matter removal mode (step S44). When the predetermined time has not elapsed in the driving in the foreign matter removal mode (NO in step S44), the driving circuit 30 returns the processing to step S41 to keep the protection cover 2 vibrating at the vibration level of the acceleration rate=about $2.0 \times 10^6$ m/s$^2$, for example.

When the predetermined time has elapsed in the driving in the foreign matter removal mode (YES in step S44), the driving circuit 30 provides, via the notifier 40, a notification of an abnormality that foreign matter cannot be removed (step S45). After providing the notification of the abnormality in step S45, the driving circuit 30 stops the cleaning processing. Accordingly, the driving circuit 30 can notify a user of the state in which foreign matter cannot be removed and can prevent long time driving in the foreign matter removal mode, being able to lower the failure risk.

When the drive frequency f is returned to the drive frequency for the driving in the foreign matter detection mode (YES in step S43), the driving circuit 30 determines that the foreign matter sticking to the protection cover 2 has been completely removed and respectively adjusts the amplitude voltage VDD and the duty ratio D of the drive signal $V_{OUT}$ to about 30 V and about 10%, for example, to supply the drive signal $V_{OUT}$ from the driver circuit 31 to the piezoelectric material 15, for the driving in the foreign matter detection mode (step S46). That is, the driving circuit 30 vibrates the protection cover 2 at the vibration level of the acceleration rate=about $0.5 \times 10^6$ m/s$^2$, for example. In the flowchart shown in FIG. 15, the duty ratio D is adjusted to control the vibration level of the protection cover 2. However, the vibration level of the protection cover 2 may be controlled by adjusting the amplitude voltage VDD or the vibration level of the protection cover 2 may be controlled by adjusting the amplitude voltage VDD and the duty ratio D.

The driving circuit 30 determines whether or not the drive frequency f is changed (step S47). When the drive frequency f is changed (YES in step S47), the driving circuit 30 determines that foreign matter is stuck to the protection cover 2 and the driving circuit 30 returns the processing to step S41 to switch the driving to the one in the foreign matter removal mode and vibrate the protection cover 2 on the vibration level of the acceleration rate=about $2.0 \times 10^6$ m/s$^2$, for example. Here, the drive frequency f is changed also depending on an ambient temperature. Therefore, determination is preferably performed depending on a temporal change amount of the frequency so as to distinguish the frequency change caused by foreign matter removal from the frequency change caused by the ambient temperature.

When the drive frequency f is not changed (NO in step S47), the driving circuit 30 returns the processing to step S46 to keep the protection cover 2 vibrating on the vibration level of the acceleration rate=about $0.5 \times 10^6$ m/s$^2$, for example. That is, the driving circuit 30 continues the driving in the foreign matter detection mode. Here, when the driving circuit 30 receives interruption processing to end the operation of the cleaning device, the driving circuit 30 ends the operation of the cleaning device.

As described above, the cleaning device according to the fifth preferred embodiment further includes the notifier 40 that notifies a user of information. The driving circuit 30 issues a notification of an abnormality with the notifier 40 in a case where a frequency to drive the piezoelectric material 15 is not returned to the frequency of the foreign matter detection mode when controlling the driver circuit 31 in the foreign matter removal mode.

Thus, in a case where removal is impossible at the vibration level in the foreign matter removal mode, the cleaning device according to the fifth preferred embodiment uses the notifier 40 to notify a user of the state, thus being able to notify the user of the abnormality that foreign matter cannot be removed.

Other Modifications

Figure 16:
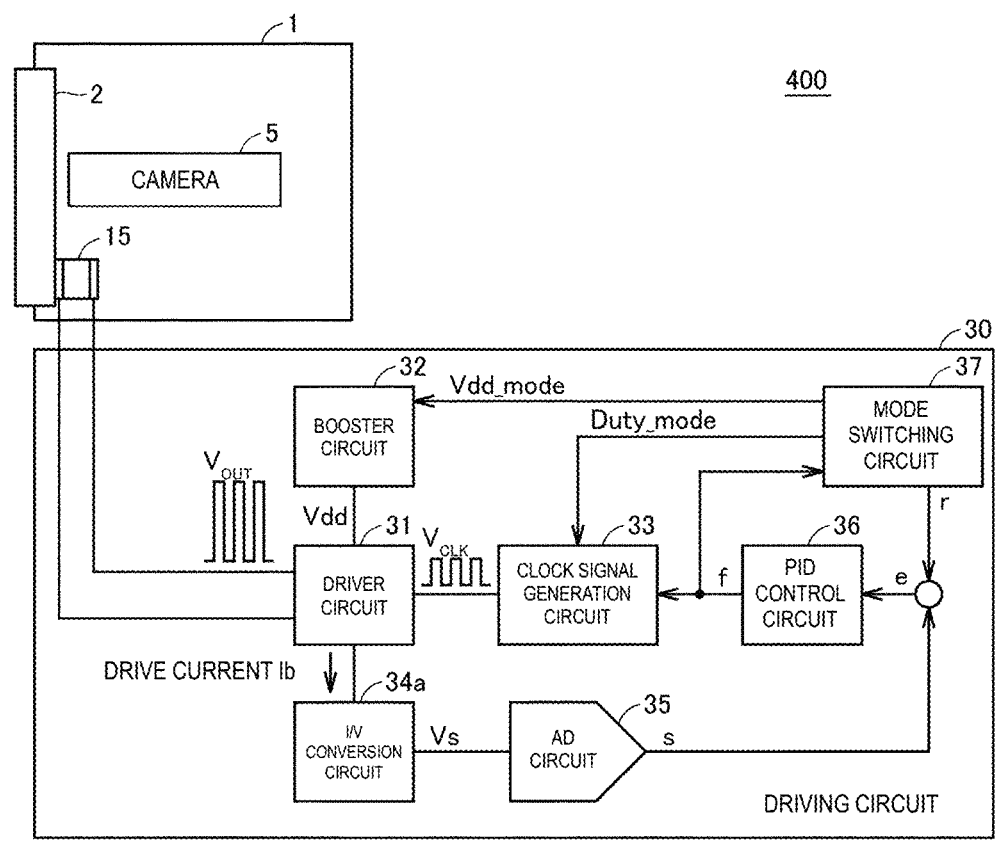
FIG. 16 is a block diagram for explaining a cleaning device of an imaging unit according to a modification of a preferred embodiment of the present invention.

The cleaning devices of the imaging units according to the above-described preferred embodiments are provided with the vibration sensor 70 to detect the vibration level of the protection cover 2. However, the cleaning devices of the imaging units may be configured to be able to detect the vibration level of the protection cover 2 without being provided with the vibration sensor 70. FIG. 16 is a block diagram for explaining a cleaning device of an imaging unit 400 according to a modification of a preferred embodiment of the present invention. In the imaging unit 400 illustrated in FIG. 16, the same or corresponding components as those of the imaging unit 100 illustrated in FIG. 1 are denoted by the same reference characters and detailed description thereof will not be repeated.

The imaging unit 400 includes the casing 1, the protection cover 2, the camera 5, the piezoelectric material 15, and the driving circuit 30. Here, the protection cover 2, the piezoelectric material 15, and the driving circuit 30, excluding the camera 5 of the imaging unit 400, define a cleaning device to clean off foreign matter (deposits) present in an imaging range of the camera 5. the vibration sensor 70 is omitted and the imaging unit 400 is provided with an I/V conversion circuit 34a in place of the amplifier circuit 34. The I/V conversion circuit 34a inputs a drive current Ib of the driver circuit 31 and converts the drive current Ib into a voltage, outputting a signal Vs. The AD circuit 35 converts the signal Vs, obtained through the conversion by the I/V conversion circuit 34a, into a digital signal.

The cleaning device of the imaging unit 400 does not detect the vibration level of the protection cover 2 based on the signal Vb detected by the vibration sensor 70, but detects the vibration level of the protection cover 2 based on the drive current Ib of the driver circuit 31. That is, a value of current flowing through the piezoelectric material 15 is the signal related to the vibration level of the protection cover 2 vibrated with the piezoelectric material 15, and the I/V conversion circuit 34a that converts the signal defines and functions as a detector.

The cleaning device of the imaging unit 400 does not need to be separately provided with the vibration sensor 70. Accordingly, the number of components can be reduced and a manufacturing cost can be reduced.

The configuration of the camera 5 has not been specifically described in detail in the description of the imaging units according to the above-described preferred embodiments. However, a camera, LiDAR, Rader, and the like, for example, may be included as the camera 5.

The imaging units according to the above-described preferred embodiments are not limited to an imaging unit mounted on a vehicle, but is similarly applicable to an imaging unit that is required to clean a light transmission body provided in a viewing field of an imaging element.

Each of the imaging units according to the above-described preferred embodiments may be appropriately combined with the configuration of another preferred embodiment as long as the combination is not a contradictory combination. For example, at least one of the configurations of the third to fifth preferred embodiments may be combined with the imaging unit 100 according to the second preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cleaning device comprising:
    a light transmission body in a viewing field of an imaging device;
    a vibrator to vibrate the light transmission body;
    a driver to drive the vibrator;
    a detector to detect a signal related to a vibration level of the light transmission body vibrated with the vibrator; and
    a controller to control the driver based on a signal detected by the detector so that the signal detected by the detector matches a predetermined target value of the vibration level of the light transmission body; wherein
    the vibration level of the light transmission body is an acceleration rate of the light transmission body.

2. The cleaning device according to claim 1, wherein the target value is lower than a vibration level at which a maximum displacement of the light transmission body is obtained at a driving frequency, and is higher than or equal to a vibration level at which a foreign matter stuck to the light transmission body is able to be removed.

3. The cleaning device according to claim 1, wherein
    the target value includes a first target value and a second target value higher than the first target value; and
    the controller is configured or programmed to switch between a foreign matter detection mode in which the driver is controlled so that the signal detected by the detector matches the first target value and a foreign matter removal mode in which the driver is controlled so that the signal detected by the detector matches the second target value; and
    the controller is configured or programmed to switch to the foreign matter removal mode in a case where a driving frequency to drive the vibrator is reduced when controlling the driver in the foreign matter detection mode.

4. The cleaning device according to claim 3, wherein
    the first target value is a vibration level on which the acceleration rate of the light transmission body is below about $1.5 \times 10^6$ m/s$^2$; and
    the second target value is a vibration level on which the acceleration rate of the light transmission body is about $1.5 \times 106$ m/s$^2$ or higher.

5. The cleaning device according to claim 3, wherein
    the target value further includes a third target value that is a higher vibration level than the second target value; and
    the controller is configured or programmed to control the driver so that a signal detected by the detector matches the third target value in a case where the driving frequency to drive the vibrator is not returned to a frequency of the foreign matter detection mode even by controlling the driver so that the signal detected by the detector matches the second target value.

6. The cleaning device according to claim 3, further comprising:
    a discharger to discharge a cleaning material to a surface of the light transmission body; wherein
    the controller is configured or programmed to discharge the cleaning material from the discharger when the driving frequency to drive the vibrator is not returned to the frequency of the foreign matter detection mode even by controlling the driver so that the signal detected by the detector matches the second target value.

7. The cleaning device according to claim 3, further comprising:
    a notifier to notify a user of information; wherein
    the controller is configured or programmed to issue via the notifier a notification of an abnormality when the frequency to drive the vibrator is not returned to the frequency of the foreign matter detection mode when controlling the driver in the foreign matter removal mode.

8. The cleaning device according to claim 1, wherein the controller is configured or programmed to control at least one of a voltage and a duty ratio of a drive signal used to drive the vibrator by the driver.

9. The cleaning device according to claim 1, wherein the detector includes a sensor to detect a signal related to the vibration level of the light transmission body, the light transmission body being vibrated with the vibrator, to be in non-contact with the vibrator.

10. The cleaning device according to claim 9, wherein the sensor is an ultrasonic sensor to detect an acoustic wave generated by vibration of the vibrator.

11. The cleaning device according to claim 1, wherein the detector is a conversion circuit to convert a value of current flowing through the vibrator into a signal related to the vibration level of the light transmission body vibrated with the vibrator.

12. An imaging unit comprising:
an imaging device; and
the cleaning device according to claim 1.

13. The imaging unit according to claim 12, wherein the target value is lower than a vibration level at which a maximum displacement of the light transmission body is obtained at a frequency to drive and is higher than or equal to a vibration level at which a foreign matter stuck to the light transmission body is able to be removed.

14. A cleaning device comprising:
a light transmission body in a viewing field of an imaging device;
a vibrator to vibrate the light transmission body;
a driver to drive the vibrator;
a detector to detect a signal related to a vibration level of the light transmission body vibrated with the vibrator; and
a controller to control the driver based on a signal detected by the detector so that the signal detected by the detector matches a predetermined target value of the vibration level of the light transmission body; wherein
the target value is a vibration level on which the acceleration rate of the light transmission body is about $1.5 \times 10^6$ m/s$^2$ or higher.

15. A control method for a cleaning device including a light transmission body in a viewing field of an imaging device, a vibrator to vibrate the light transmission body, a driver to drive the vibrator, a detector to detect a signal related to a vibration level of the light transmission body vibrated with the vibrator, and a controller to control the driver based on a signal detected by the detector, the control method comprising:

driving the vibrator in a foreign matter detection mode in which the driver is controlled so that the signal detected by the detector matches a first target value;

determining whether or not a frequency to drive the vibrator is lowered when controlling the driver in the foreign matter detection mode;

driving the vibrator in a foreign matter removal mode in which the driver is controlled so that the signal detected by the detector matches a second target value, the second target value being a higher vibration level than the first target value, in a case where the frequency for driving the vibrator is reduced; and returning driving of the vibrator to the foreign matter detection mode in a case where the frequency to drive the vibrator is returned to a frequency of the foreign matter detection mode when controlling the driver in the foreign matter removal mode; wherein the driving the vibrator in the foreign matter detection mode, the determining whether or not the frequency to drive the vibrator is lowered, and the driving the vibrator in the foreign matter removal mode are performed by the controller.

16. The control method according to claim 15, wherein the vibration level of the light transmission body is an acceleration rate of the light transmission body.

17. The control method according to claim 15, wherein the controller controls at least one of a voltage and a duty ratio of a drive signal used to drive the vibrator by the driver.

18. The control method according to claim 15, wherein driving of the vibrator is started from the foreign matter removal mode irrespective of whether or not a foreign matter sticks to the light transmission body.

* * * * *